(12) United States Patent
Konno et al.

(10) Patent No.: US 7,609,354 B2
(45) Date of Patent: Oct. 27, 2009

(54) ACTIVE MATRIX SUBSTRATE AND LIQUID CRYSTAL DISPLAY DEVICE WITH THE SAME

(75) Inventors: Takayuki Konno, Kanagawa (JP); Satoshi Inada, Kanagawa (JP); Yoshiro Kitagawa, Kanagawa (JP); Shinichi Nishida, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 79 days.

(21) Appl. No.: 11/090,662

(22) Filed: Mar. 28, 2005

(65) Prior Publication Data

US 2005/0211986 A1 Sep. 29, 2005

(30) Foreign Application Priority Data

Mar. 29, 2004 (JP) ............................. 2004-095410

(51) Int. Cl.
*G02F 1/1345* (2006.01)
(52) U.S. Cl. ...................................... 349/151; 349/149
(58) Field of Classification Search .......... 349/149–152
See application file for complete search history.

(56) References Cited

U.S. PATENT DOCUMENTS

2002/0021398 A1* 2/2002 Matsumoto ................. 349/149
2002/0105612 A1* 8/2002 Ohta et al. ................... 349/141

FOREIGN PATENT DOCUMENTS

| CN | 1435720 A | 8/2003 |
|---|---|---|
| JP | 8-171097 | 7/1996 |
| JP | 9-160076 | 6/1997 |
| JP | 98/47044 A1 | 10/1998 |
| JP | 11-52394 | 2/1999 |
| JP | 11-119237 | 4/1999 |
| JP | 2002-6773 | 1/2002 |
| JP | 2002-5532 A | 2/2002 |
| JP | 2002-311439 | 10/2002 |

* cited by examiner

Primary Examiner—Dung T. Nguyen
(74) Attorney, Agent, or Firm—Sughrue Mion, PLLC

(57) ABSTRACT

Disclosed is a liquid crystal display device that includes a TFT substrate. A plurality of gate lines and a plurality of common lines extend in a first direction on the TFT substrate. Drain lines extend in a second direction substantially perpendicularly to these lines. Bus lines are located outside a display area and are extending parallel to the drain lines. Common line terminals are provided on either side of each block that is constituted by a predetermined number of gate terminals. The common line terminals and the lead lines therefor are formed on the same layer as the drain lines and are connected to the bus lines on the same layer without any contacts being used. Resistance along the routes taken by common lines can be reduced.

7 Claims, 17 Drawing Sheets

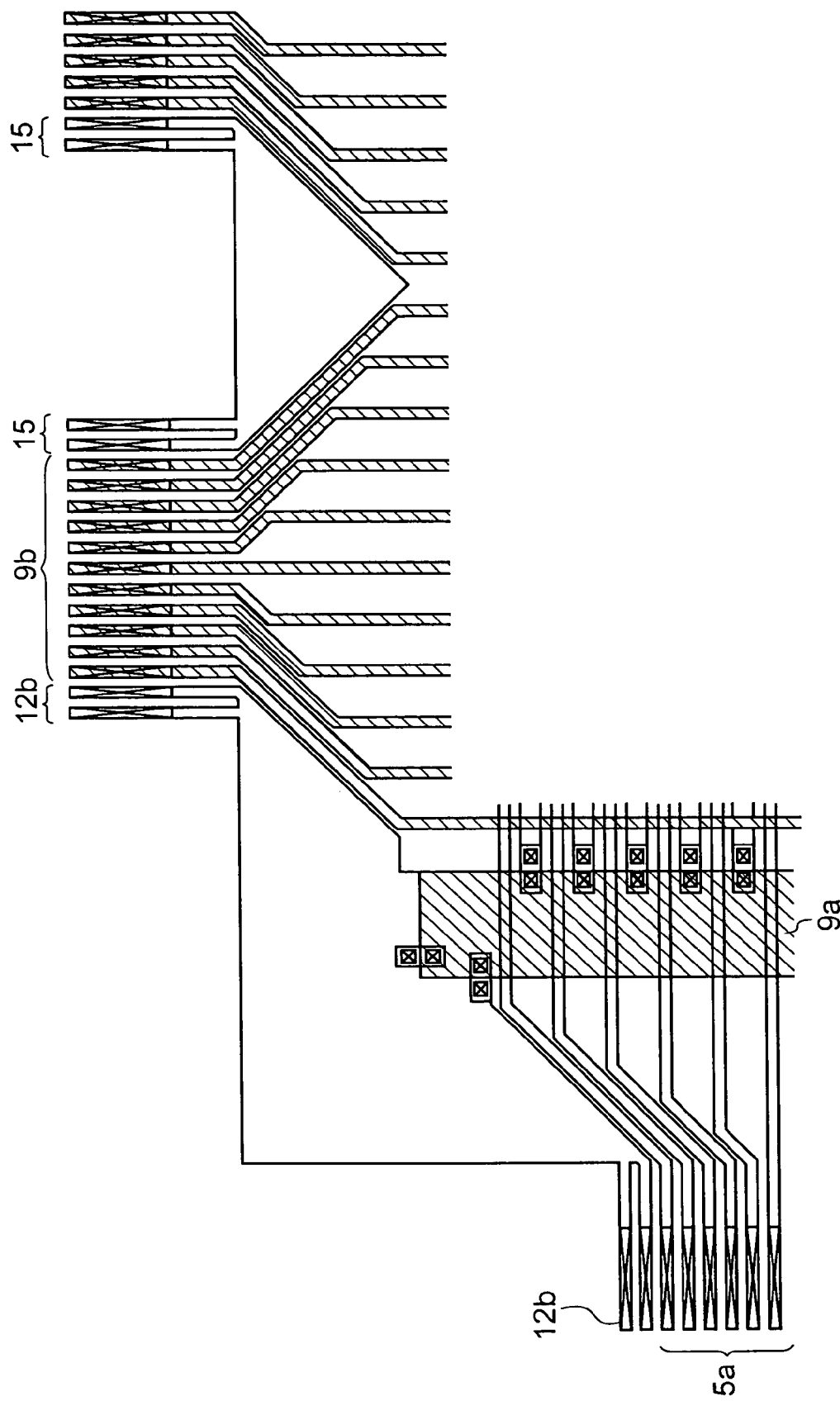

TFT SUBSTRATE

2a PIXEL

RUBBING DIRECTION

I-I CROSS SECTION | II-II CROSS SECTION | III-III CROSS SECTION

ACTIVE MATRIX SUBSTRATE AND LIQUID CRYSTAL DISPLAY DEVICE WITH THE SAME

BACKGROUND OF THE INVENTION

1. Field of the Invention

The present invention relates to an active matrix substrate and a liquid crystal display device with the same.

2. Description of the Related Art

Recently, active matrix liquid crystal display devices, which employ thin film transistors (hereinafter referred to as TFTs) as pixel switching elements, have been widely employed as high-resolution display devices. Classifications for these liquid crystal display devices include the Twisted Nematic (TN) mode type where a director for aligned molecules of liquid crystal is rotated to a direction perpendicularly to a TFT substrate, and the In Plane Switching (IPS) mode type where the director is rotated to a direction parallel to a TFT substrate.

In the IPS-mode liquid crystal display device, pixel electrodes and common electrodes are alternately arranged, parallel to each other, on a TFT substrate whereon TFTs are formed. Then, an electric field parallel to the substrate surface is formed by applying a voltage between the pixel electrodes and the common electrodes, and the direction of the director of liquid crystals is thus changed. A quantity of light to be transmitted through the IPS-mode liquid crystal device is controlled depending on the direction of the director of liquid crystals. According to this display method, since the director is rotated within the substrate surface unlike in the case of the TN-mode type, it is possible to evade a problem that relations between the quantity of transmitted light and the applied voltage differ greatly when viewed from the director and when viewed in the normal direction of the substrate. The IPS-mode liquid crystal display device can thus provide a preferable image even when the visual angle is very large.

A plurality of gate lines (equivalent to scan lines) and a plurality of drain lines (equivalent to signal lines) are provided substantially orthogonally on the TFT substrate, in order-to drive the TFTs arranged to form a matrix. Further, gate terminals to be connected to the gate lines, or drain terminals to be connected to the drain lines, are arranged in the terminal area, at the outer edge of the TFT substrate. For the IPS-mode liquid crystal display device, common lines for connecting common electrodes, which are provided for respective pixels, are also formed on the same layer as the gate lines. Accordingly, common line terminals, to which the common lines are to be connected, must be formed in the terminal area.

Here, on account of the size reduction of the TFT substrate for downsizing and higher integration of a liquid crystal display, the respective common lines can not separately be connected to the terminals. Therefore, for a conventional IPS-mode liquid crystal display device, generally, a line (hereinafter referred to as a bus line) extending substantially parallel to the drain lines is formed between the display area and the terminal area. That is, a structure is employed wherein the respective common lines are joined at a bus line, and the joined common lines are branched to the common line terminals located at predetermined intervals.

This structure will be explained while referring to FIGS. 1A and 1B. FIG. 1A is a plan view of the structure in the vicinity of the gate terminals for the TFT substrate of a conventional IPS-mode liquid display device. FIG. 1B is a cross-sectional view taken along the line IV-IV in FIG. 1A. With reference to FIGS. 1A and 1B, for the conventional IPS-mode liquid crystal display device, the ends of the common lines 6 extending from a display area are connected and joined to a bus line 9a by contacts 11b. Further, via the bus line 9a and a contact 11c, the ends of the common lines 6 extending from the display area are connected to a lead line 13 for common line terminals 12b which are formed on the same layer as are gate lines 5.

By employing this structure, the required number of common line terminals 12b can be reduced. However, in the display area, the common lines 6 are formed on the same layer as the gate lines 5 and are connected by the contacts 11b to the bus line 9a formed on the same layer as the drain lines. Further, the common lines 6 are also connected by the contact 11c to the lead lines 13 formed on the same layer as the gate lines 5. Therefore, the common lines 6 must pass through at least two contacts en routes to the common line terminals 12b. As a result, resistance along the routes taken by the common line (common line routes, hereafter) is increased, signals transmitted along the common lines are delayed and display failures such as traverse cross talk and flickers occur.

In order to suppress display failures such as traverse cross talk and flickers due to resistance along the common line routes, various methods have been proposed. For example, a liquid crystal display device which includes lead lines, of which portions facing a display area are connected to common lines, is disclosed in Japanese Patent Laid-Open Publication No. 2002-55352 (pp. 7-12, FIG. 2).

By referring again to the conventional liquid crystal display device in FIG. 1A, the lead lines 13, of which portions facing the display area are connected to the common lines 6, are provided at the end of a glass substrate at predetermined pitches. The lead lines 13, composed of metal films of which the transmittance of light emitted by a backlight is extremely low, are positioned between terminals which are divided into and joined as a plurality of blocks. The lead lines 13 are so provided that they substantially fill the intervals between the blocks.

The conventional liquid crystal display device disclosed in the above publication has a constitution where the lead lines 13 are provided and are connected to the common line terminals 12b which are located at either end of the adjacent groups (blocks) of the gate terminals 5a. For the conventional liquid crystal display device, a metal film having the shape of a substantially isosceles triangle is deposited in an area which is sandwiched between lead lines 13, so as to reduce, to a degree, resistance along the common line routes.

However, in order to connect the common lines 6 in the display area and the common line 12b as described above, the common lines 6 on the same layer as the gate lines 5 in the display area must be connected, via the bus line 9a formed on the same layer as the drain lines 9, to the common line terminals 12b on the same layer as the gate lines 5. That is, the two contacts 11b and 11c must be passed through. These contacts are generally formed of Indium Tin Oxide (hereinafter referred to as ITO) which is employed for a common electrode. However, since the contact areas are small and hence resistance of ITO is higher than resistance of metal lines, the reduction in resistance along the common line routes is limited when the structure of the conventional liquid crystal display device disclosed in the above publication is used. As a result, it is not possible to satisfactorily prevent display failures such as traverse cross talk and flickers from occurring when signals transmitted along the common line routes are delayed.

The present invention is offered to resolve the above-described problems, and the main objective of the invention is the provision of an active matrix substrate by which display failures such as traverse cross talk and flickers can be prevented from occurring when signals along the common line routes are delayed, and a liquid crystal display device which employs the substrate.

SUMMARY OF THE INVENTION

According to the present invention, an active matrix substrate includes: a plurality of scan lines and a plurality of common lines extending in a first direction; a plurality of signal lines extending in a second direction; and pixels formed in areas defined by the scan lines and by the signal lines. Further, the active matrix substrate includes bus lines located outside a display area where the pixels are arranged to form a matrix, which extends substantially parallel to the signal lines. Furthermore, for the active matrix substrate of this invention, common line terminals to be connected to the common lines are provided on either side of each of a plurality of scan line groups which are located in a terminal area outside the bus lines. The facing common line terminals, of the adjacent groups of the scan line terminal (scan line terminal groups, hereafter), and the bus lines are connected by lead lines for the common line (common line lean lines, hereafter). For this active matrix substrate, the bus lines, the common line lead lines and the common line terminals are formed of a material for lines on the same layer.

In addition, for the active matrix substrate according to the invention, the bus lines, the common line lead lines and the common line terminals are formed on the same layer as the signal lines.

Furthermore, the active matrix substrate of the inventions provided with the bus lines and the common line lead lines which are connected by a plurality of connecting portions, including connecting portions which do not intersect scan line lead lines connected to scan line terminals, and connecting portions which intersect at least one of the scan line lead lines, viewed in the normal direction of the active matrix substrate.

Further, in the active matrix substrate according to the invention, the substantially entire surface of the area, which is enclosed by the facing common line terminals of the adjacent scan line terminal groups and by the common line lead lines, is covered with a metal film.

Moreover, according to the invention, the active matrix substrate is provided with the common line lead lines formed by a conductive material which permits the passage of ultraviolet rays, at least in a sealing area where an ultraviolet cured sealing material is to be applied or written, the sealing material which is used to attach the substrate with an opposed substrate.

Additionally, for the active matrix substrate of the invention, the common lines, the bus lines, the common line lead lines and the common line terminals are sequentially formed in a predetermined layer differing from the layer of the scan lines and the signal lines.

BRIEF DESCRIPTION OF THE DRAWINGS

FIG. 2 is a plan view of the structure in the vicinity of a corner of the conventional TFT substrate.

DETAILED DESCRIPTION OF THE PREFERRED EXEMPLARY EMBODIMENTS

The invention will now be described herein with reference to illustrative exemplary embodiments. Those skilled in the art will recognize that many alternative exemplary embodiments can be accomplished by using the teachings of the present invention and that the invention is not limited to the illustrated exemplary embodiments, which are provided for explanatory purposes.

According to a first exemplary embodiment of the present invention, a liquid crystal display device comprises: a plurality of gate lines and a plurality of common lines, extending in a first direction; a plurality of drain lines extending substantially perpendicular to the first direction; and bus lines arranged outside a display area and extending substantially parallel to the drain lines. Further, the liquid crystal display device according to the invention is provided with various structures for reducing resistance along the common line routes, on a TFT substrate where a plurality of common terminals on either side of a block composed of a predetermined number of gate terminals can be provided.

Specifically, the common lines in the display area and the common line terminals in the terminal area are connected by a shortened traveling through the layers. Further, resistance between the bus lines and the lead lines and resistance between the lead lines and the common line terminals are reduced to prevent display failures from occurring when signals along the common line routes are delayed. Furthermore, at least in a sealing area where a sealing material is to be applied or to be written, ultraviolet reflection due to the lead lines is suppressed and the sealing material is appropriately cured, while resistance along the common line routes is reduced.

First Exemplary Embodiment

The present invention will now be described in more detail. With reference to FIGS. 3 to 11B, an explanation will be given for an active matrix substrate and a liquid crystal display device according to a first exemplary embodiment of the present invention.

Figure 3:
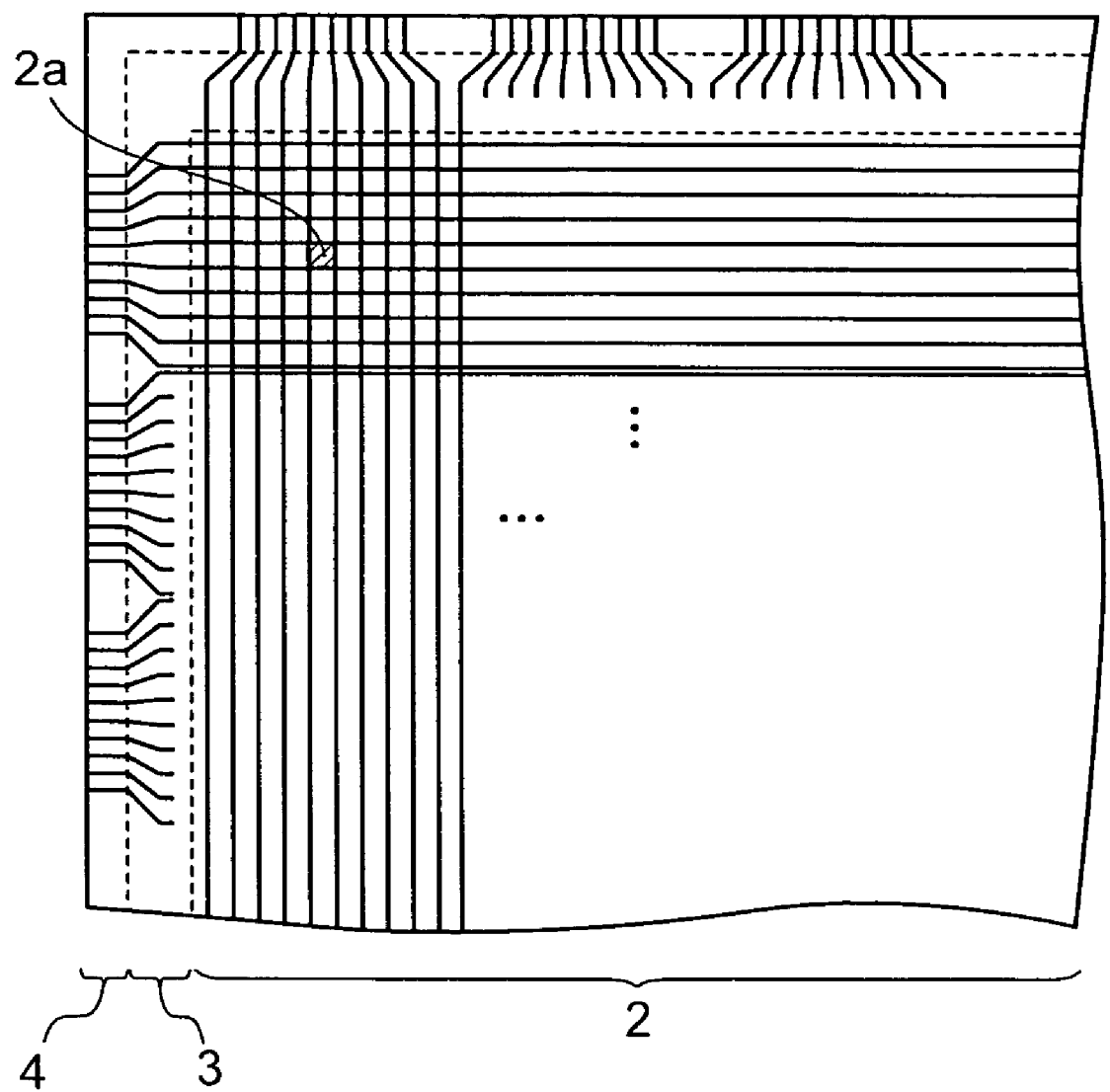
FIG. 3 is a schematic plan view of the structure of the TFT substrate of a liquid crystal display, device according to a first exemplary embodiment of the present invention.

FIG. 3 is a plan view of the schematic structure of the active matrix substrate (TFT substrate) of the liquid crystal display device according to the first exemplary embodiment.

Figure 4A:
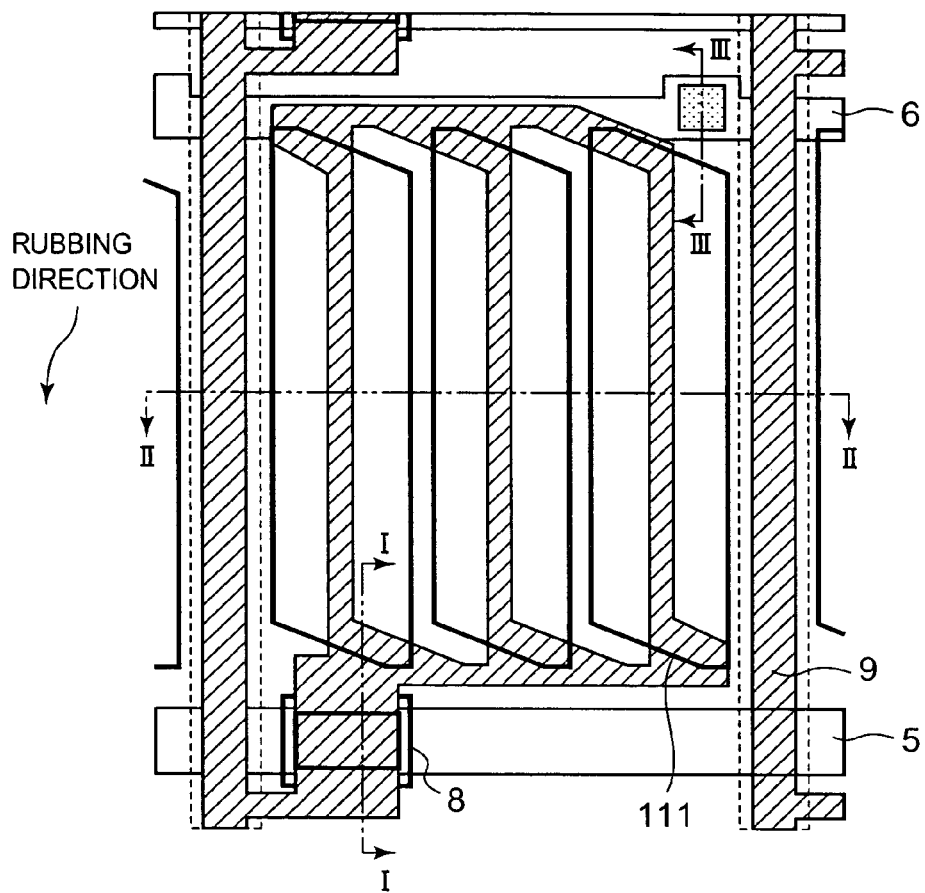
FIG. 4A is a plan view of the structure of one pixel in the TFT substrate according to the first exemplary embodiment.
Figure 4B:
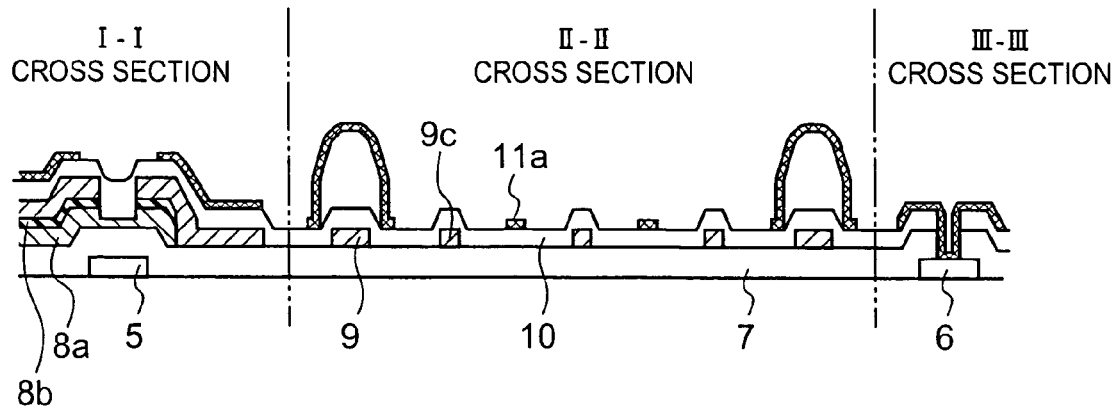
FIG. 4B is a cross-sectional view of the TFT substrate of the first exemplary embodiment, taken along the lines I-I, II-II and III-III.

FIG. 4A is a plan view of the structure of the respective pixels formed in the display area of the TFT substrate, and FIG. 4B is a cross sectional view taken along the lines I-I, II-II and III-III in FIG. 4A.

Figure 5A:
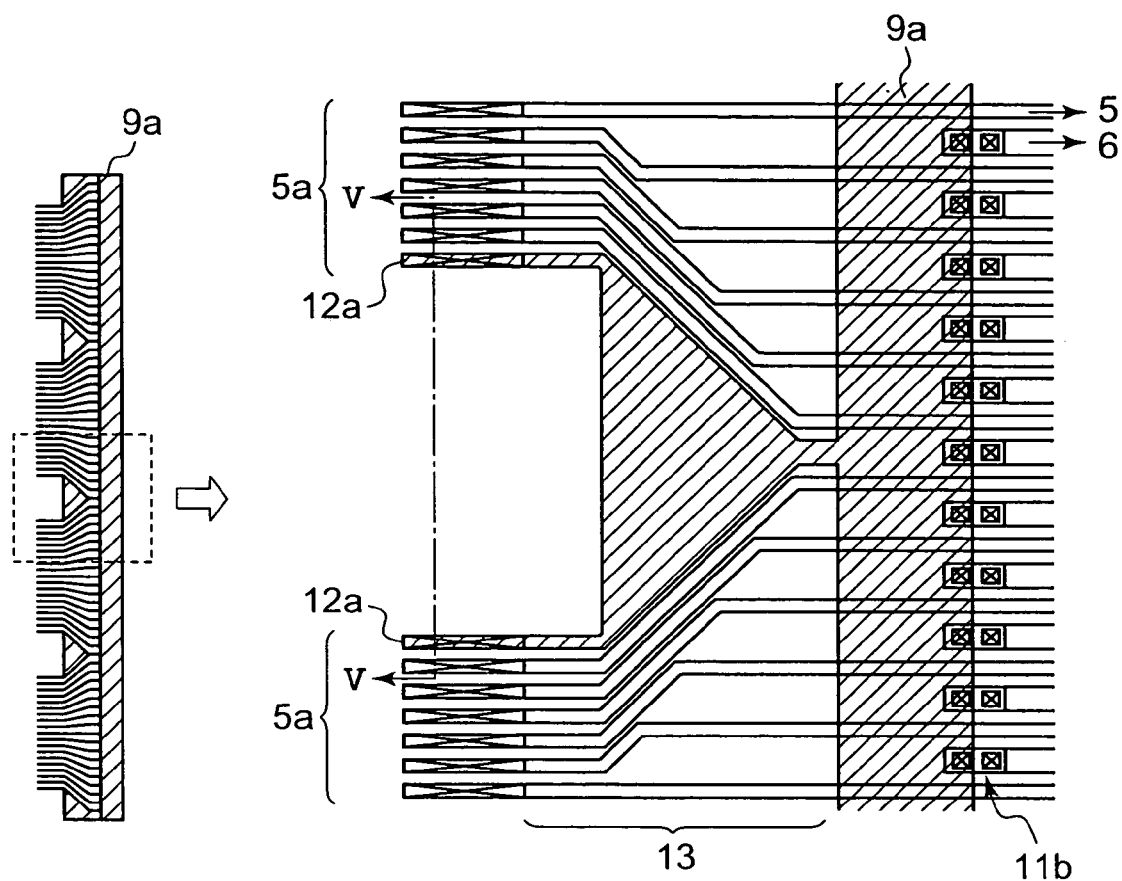
FIG. 5A is a plan view of a first structure in the vicinity of the terminal area of the TFT substrate according to the first exemplary embodiment.
Figure 5B:
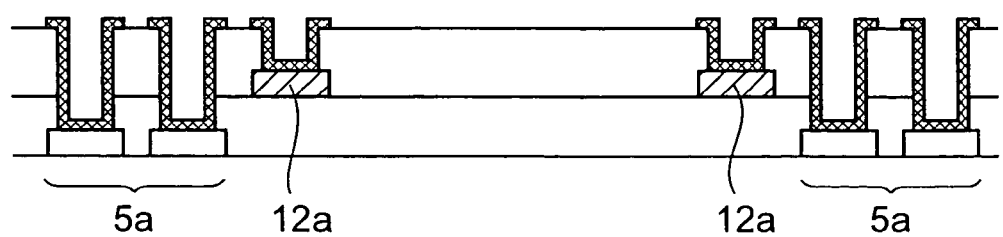
FIG. 5B is a cross-sectional view of the first structure in the vicinity of the terminal area of the TFT substrate according to the first exemplary embodiment, taken along the line V-V in FIG. 5A.

FIG. 5A is a plan view of the structure in the vicinity of the terminal area of the TFT substrate, and FIG. 5B is a cross-sectional view taken along the line V-V in FIG. 5A, while FIGS. 6A to 11B are diagrams in which variations are shown. While an IPS-mode liquid crystal display device is employed as an example in the following explanation, other arbitrary types of liquid crystal device can be employed wherein gate lines, drain lines and common lines are arranged on the same substrate. Further, while a TFT substrate, whereon TFTs are arranged to form a matrix, is employed as an active matrix substrate in the following explanation, an active matrix substrate which employs switching elements other than TFTs can also be employed.

First, the structure of the IPS-mode liquid crystal display device of this exemplary embodiment will be described. The IPS-mode liquid crystal display device in this exemplary embodiment comprises a TFT substrate 1, whereon TFTs are formed, a substrate opposed to the TFT substrate 1, and liquid crystals which are sandwiched therebetween.

With reference to FIG. 3, the TFT substrate 1 includes: a display area 2, in which pixels 2a are arranged to form a matrix; a sealing area 3, which is located outside the display area 2 and on which a sealing material is applied or written, in order to support and securely hold the substrate opposed to the TFT substrate, and in order to sandwich liquid crystals; and a terminal area 4, which is located outside the sealing area 3 and in which terminals to be connected to an external circuit are arranged.

Further, as shown in FIGS. 4A and 4B, for the respective pixels 2a in the display area 2, display portions are formed in areas defined by gate lines (scan lines) 5 and drain lines (signal lines) 9, which are extending substantially perpendicular to each other. Furthermore, TFTs are arranged in the vicinity of the intersections of the gate lines 5 and the drain lines 9.

Pixel electrodes 9c, which are located on the same layer as the drain lines 9, and common electrodes 11a, which are made of ITO, are provided for the respective display portions. The pixel electrodes 9c are connected to the source electrodes of the TFTs, and the common electrodes 11a are connected to common lines 6a extending parallel to the gate lines 5. In addition, a passivation film is deposited to cover these electrodes.

On the opposed substrate (not shown), a black matrix is formed in order to block unnecessary light which enters portions other than the display portions. Further, RGB color layers to provide a color display are also formed thereon, and a planarization film is deposited to cover the color layers.

For the IPS-mode liquid crystal display device of this exemplary embodiment, alignment layers are deposited on the inner surfaces of the TFT substrate and the opposed substrate, and are rubbed in a predetermined direction. Thereafter, liquid crystals are held between the two substrates. Furthermore, for the IPS-mode liquid crystal display device of this exemplary embodiment, a predetermined number of the gate lines 5, the common lines 6, and the drain lines 9 which substantially orthogonally intersect the gate lines 5 and the common lines 6, are collected at the terminal area 4, thus forming a block. The blocks are connected to a flexible substrate through an anisotropic conductive film (ACF). In this exemplary embodiment, a constant common potential is then applied, via the common lines 6, to all the common electrodes 11a, and the liquid crystal is twisted and deformed on a plane parallel to the substrate to control the display by applying a potential to the pixel electrodes 9c via the TFTs and by applying a traverse electric field between the pixel electrodes 9c and the common electrodes 1a.

Here, the gate lines 5 and the common lines 6 are alternately arranged in the display area 2, and the number of terminals is to be increased when these lines are to be extending directly to the terminal area 4. Thus, for the IPS-mode liquid crystal display device of this exemplary embodiment, a bus line is arranged on and substantially parallel to the same layer as the drain lines 9, outside the display area. That is, according to the method employed for the IPS-mode liquid crystal display device of this exemplary embodiment, the respective common lines 6 are joined and connected to the bus line through a contact, and for each block, a line is led from the bus line and is connected to common line terminals provided at either end of the block.

Figure 1A:
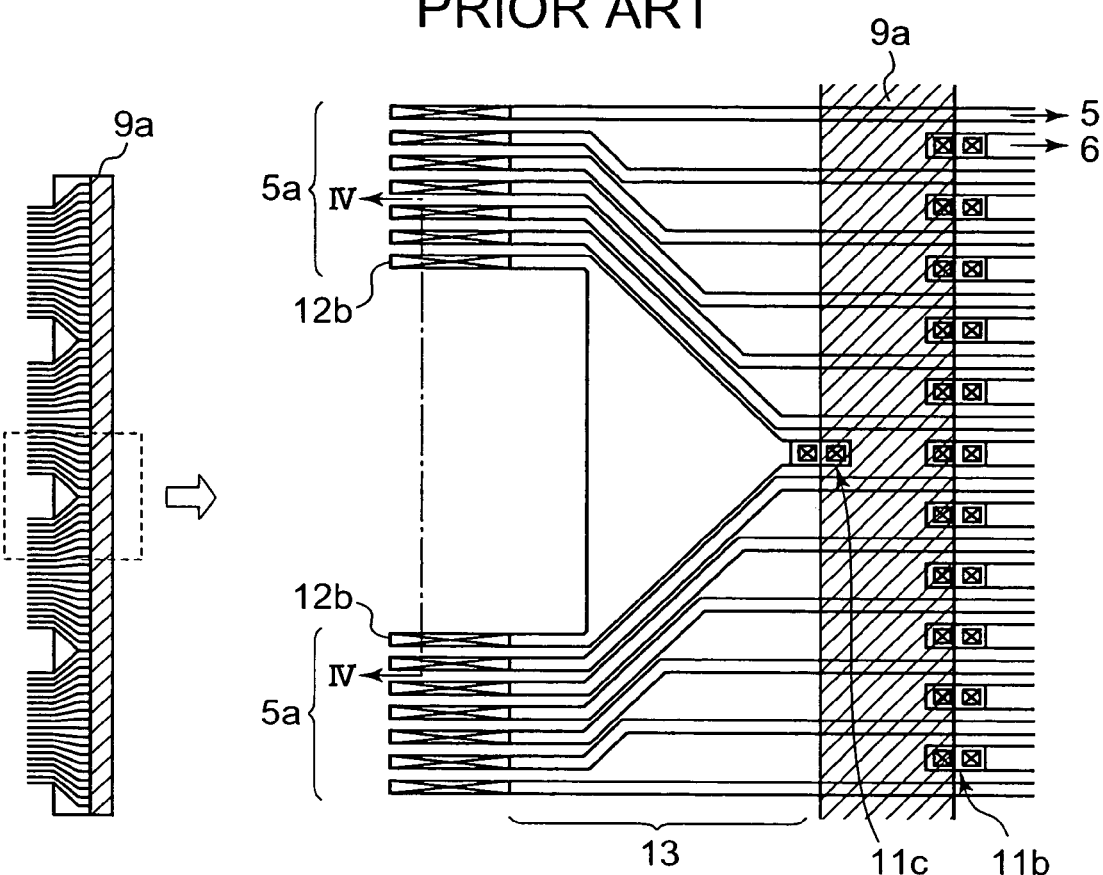
FIG. 1A is a plan view of the structure in the vicinity of the terminal area for a conventional TFT substrate.
Figure 1B:
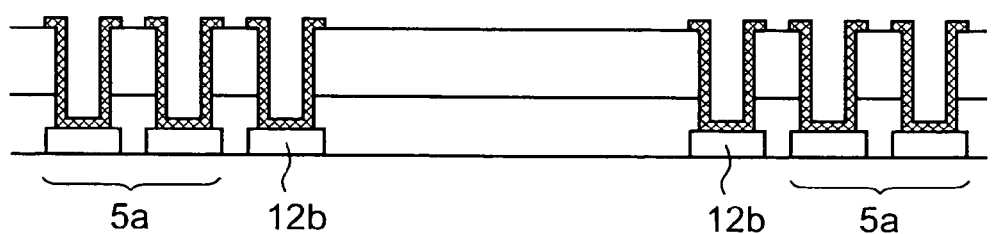
FIG. 1B is a cross-sectional view of the conventional TFT substrate taken along the line IV-IV in FIG. 1A.

For the conventional liquid crystal display device, as is shown in FIGS. 1A and 1B, however, the common line terminals 12b are formed on the same layer as the gate lines 5, i.e., at the least, the common lines 6 and the bus line 9a, and the bus line 9a and the lead lines 13 must be connected through contacts which are made of the conductive material (generally ITO) and are formed on the upper layer. Therefore, because of resistance at the contacts, resistance along the common line routes can not be reduced. Moreover, since the lead lines 13 are provided on the same layer as the gate lines 5, the connecting portions of the bus line 9a and the lead lines 13 can not be expanded, and therefore there arises a problem that resistance between the bus line 9a and the lead lines 13 is increased.

Therefore, for the IPS-mode liquid crystal display device of this exemplary embodiment, as shown in FIGS. 5A and 5B, common line terminals 12a, provided for either end of each block, and a lead line 13 to be connected to the common line terminals 12a are formed on the same layer as the drain lines 9. That is, the lead line 13 and the bus line 9a are directly connected on the same layer without contacts being used, so that resistance along the common line routes can be reduced, and display failures such as traverse cross talk and flickers can be prevented from occurring when signals transmitted over the common line routes are delayed.

As shown in FIGS. 5A and 5B, for the IPS-mode liquid crystal display device of this exemplary embodiment, a common line terminal 12a is provided at either end of each block. Here, an arbitrary number of common line terminals 12a may be employed, and a plurality of common line terminals 12a may be provided at either end of each block. The number of common line terminals 12a to be used may also differ by each end of each block, an example of which is that one common line terminal 12a may be provided-at one end, while two common line terminals 12a may be provided at the other end. Further, the number of common line terminals 12a provided at the two ends of each block may also differ by block.

According to the IPS-mode liquid crystal display device of this exemplary embodiment, the common line terminals 12a and the lead line 13 are formed on the same layer as the drain lines 9, and an inter-layer insulating film 10 is deposited between the gate terminals Sa and the lead lines 13 to prevent short circuits between the lead line 13 for the common line terminals 12a and the lead lines 13 for the gate terminals 5a. Therefore, the routes for the lead lines 13 can be freely designed, and the common line terminals 12a need not always be located at the ends of the respective blocks.

Since the structure shown in FIGS. 5A and 5B is employed for the IPS-mode liquid crystal display device of this exemplary embodiment, resistance along the common line routes can be reduced. However, as is also shown in FIGS. 5A and 5B, when portions of the lead line 13 for the common line terminals 12a, in the vicinity of the bus line 9a, are located between the adjacent gate lines 5a, the width of the connecting portion is narrowed. In this exemplary embodiment as described above, since the lead line 13 for the common line terminals 12a is formed on the same layer as the drain lines 9, short circuits with the lead lines 13 for the gate terminals 5a do not occur, regardless of routes followed by the common line terminals 12a which are connected to the bus line 9a.

Figure 6A:
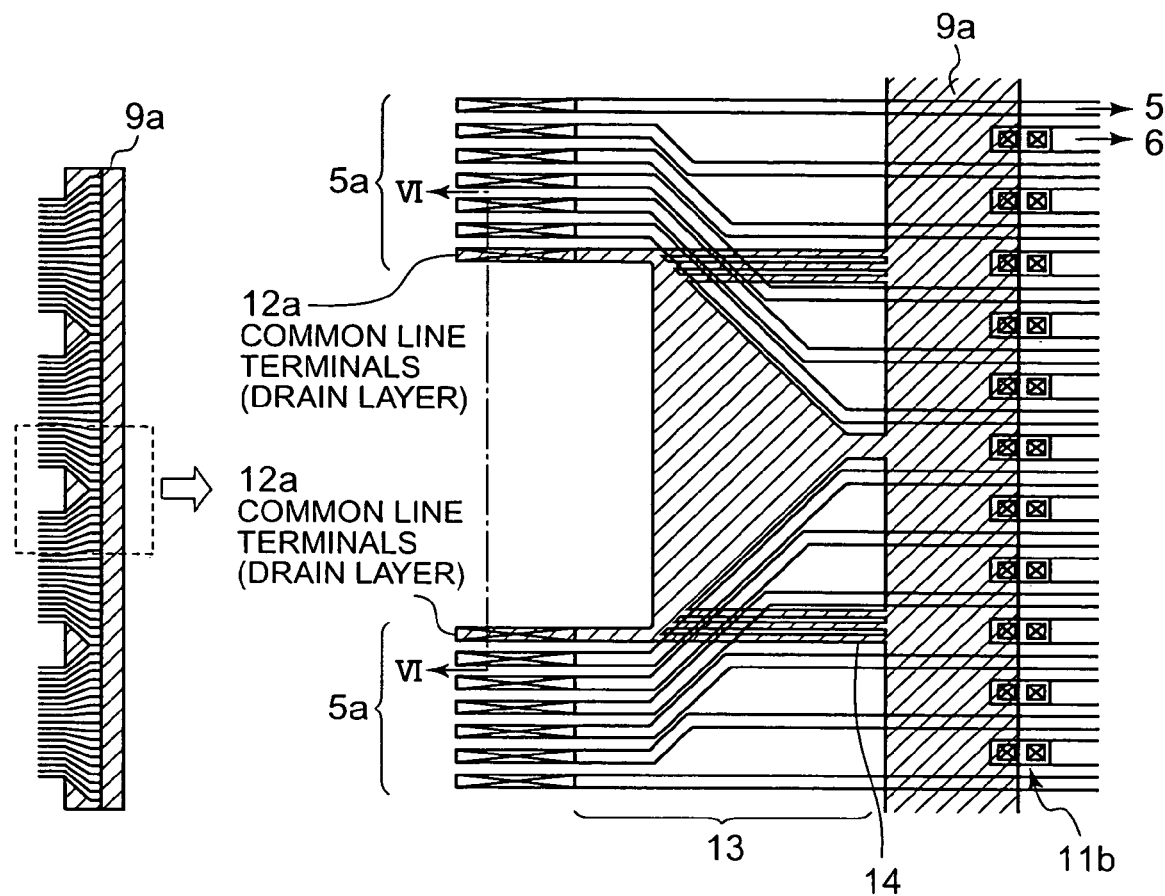
FIG. 6A is a plan view of a second structure in the vicinity of the terminal area of the TFT substrate according to the first exemplary embodiment.
Figure 6B:
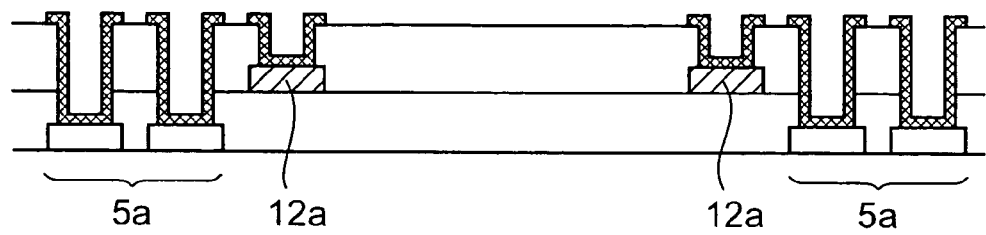
FIG. 6B is a cross-sectional view of the second structure in the vicinity of the terminal area of the TFT substrate according to the first exemplary embodiment, taken along the line VI-VI in FIG. 6A.

Furthermore, as is shown in FIGS. 6A and 6B, for the IPS-mode liquid crystal display device of this exemplary embodiment, resistance along the common line routes can be reduced by connecting the bus line 9a to the lead line 13 for the common line terminals 12a through a plurality of connecting portions 14.

It is preferable that the dimension of the intersecting area be as small as possible, since it is conceivable that capacitance may be generated between each of these line routes and that the potential of the common lines 5 may is fluctuate, when the lead line 13 for the common line terminals 12a intersects the lead lines 13 for the gate terminals 5a.

Further, as shown in FIGS. 6A and 6B, for the IPS-mode liquid crystal display device of this exemplary embodiment, three connecting portions 14 are provided on either side (upper and lower sides in FIG. 6A) of the lead line 13 for the common line terminals 12a. The number, the arrangement, the thickness and the shape of connecting portions 14 are arbitrary, and can be determined by taking into account disadvantages due to the above-mentioned capacitance and effectiveness of the reduction in resistance along the common line routes.

Figure 7A:
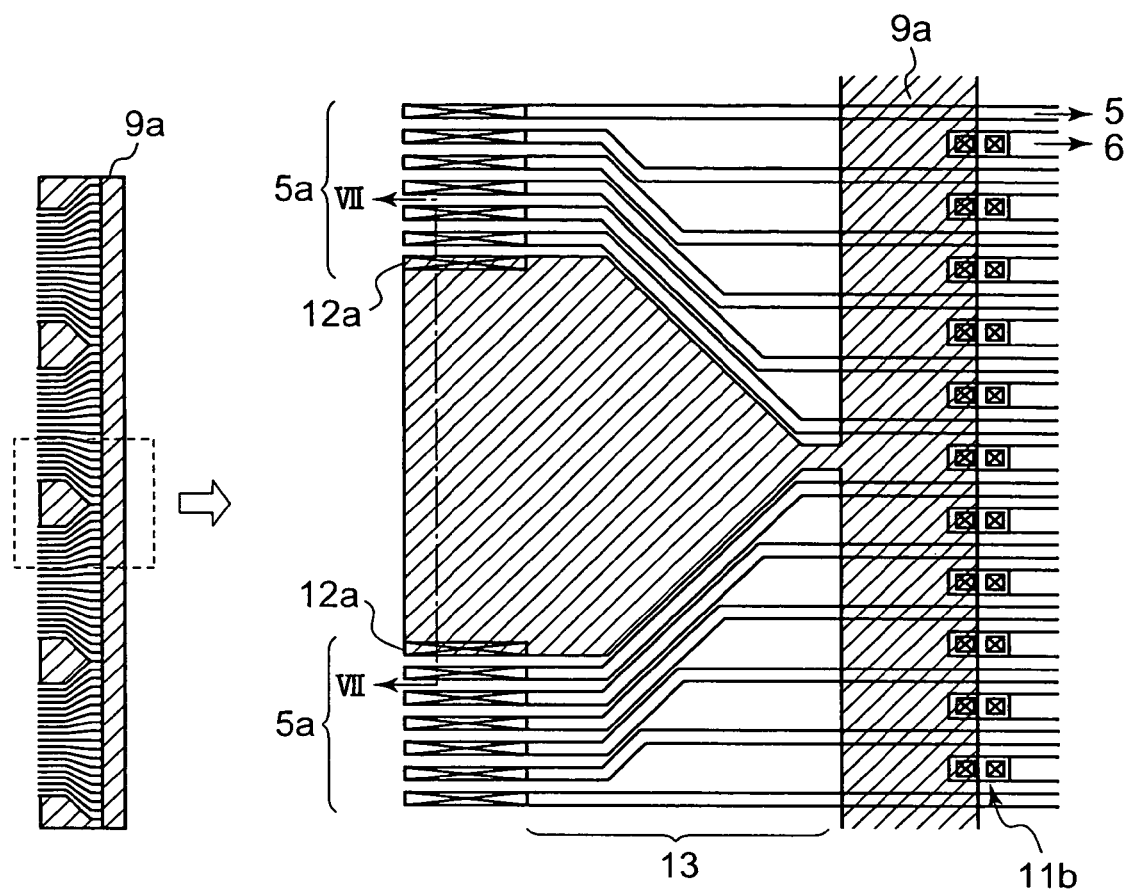
FIG. 7A is a plan view of a third structure in the vicinity of the terminal area of the TFT substrate according to the first exemplary embodiment.
Figure 7B:
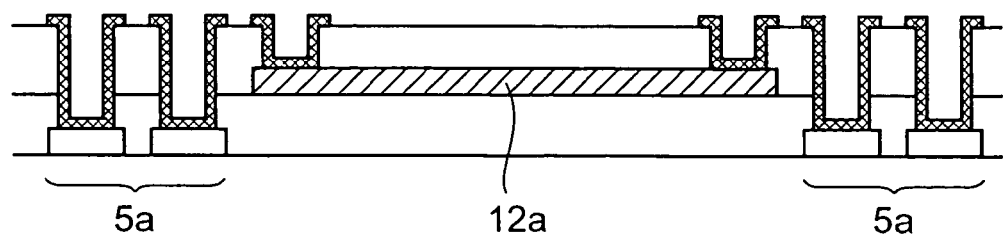
FIG. 7B is a cross-sectional view of the third structure in the vicinity of the terminal area of the TFT substrate according to the first exemplary embodiment, taken along the line VII-VII in FIG. 7A.

FIGS. 5A, 5B, 6A and 6B show structures for the IPS-mode liquid crystal display device of this exemplary embodiment, whereby resistance is reduced between the bus line 9a and the lead line 13 for the common line terminals 12a. However, since the common line terminals 12a generally have an elongated shape, resistance may be increased between the common line terminals 12a and the lead line 13. In order to avoid the phenomenon thereof, as shown in FIGS. 7A and 7B, a metal film is also deposited on the area between the facing common line terminals 12a of the adjacent blocks, which is generally unused. When the substantially entire surface of the area enclosed by the common line terminals 12a and the lead line 13 is covered with the metal film, resistance can be reduced between the common line terminals 12a and the lead line 13. According to this exemplary embodiment, since the lead line 13 is formed as to be a flat plane (in a mat form), resistance can be reduced to substantially one third of the previous amount, between the common line terminals 12a and the bus line 9a.

Figure 8A:
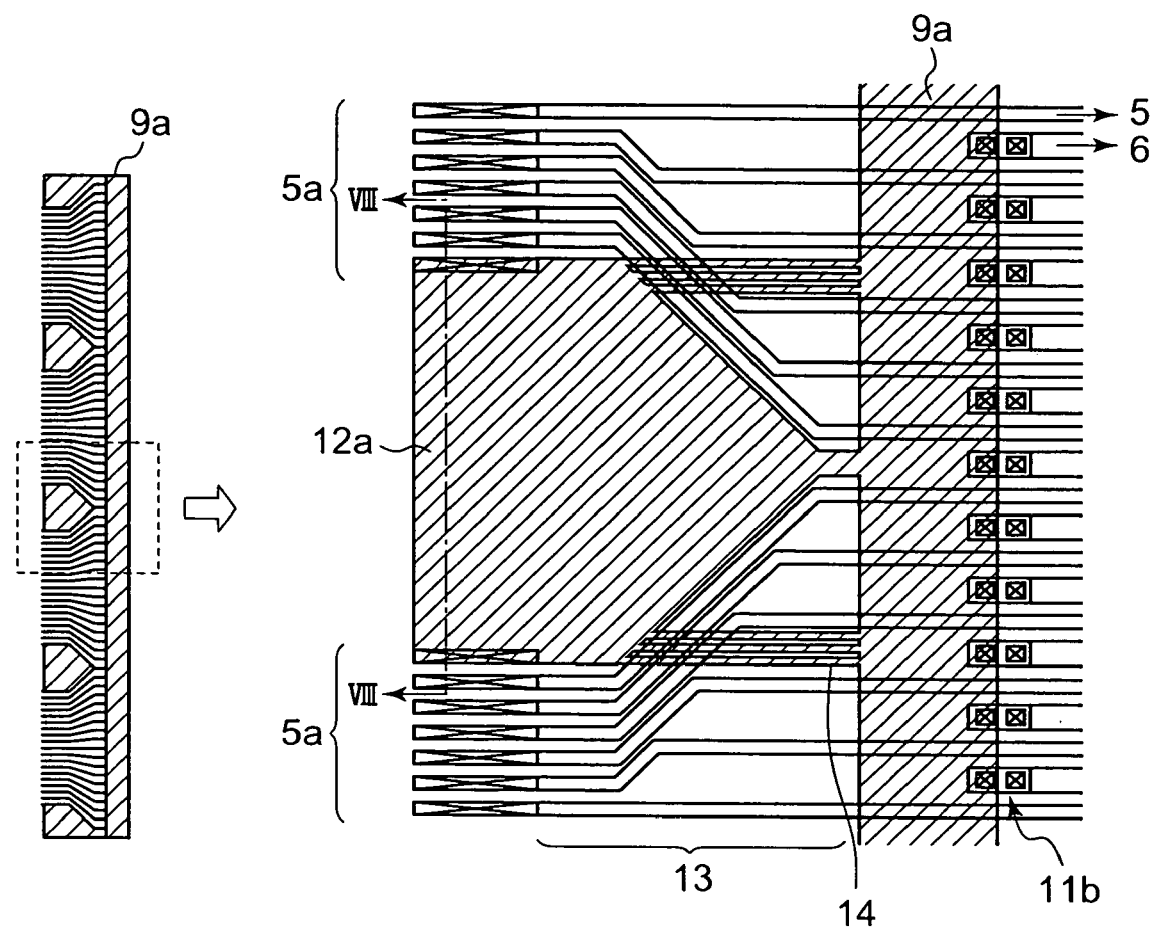
FIG. 8A is a plan view of a fourth structure in the vicinity of the terminal area of the TFT substrate according to the first exemplary embodiment.
Figure 8B:
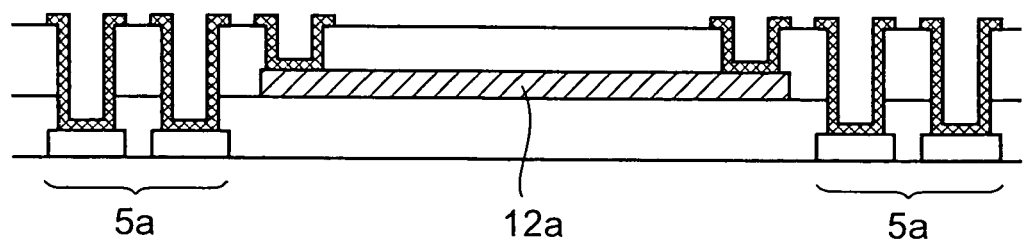
FIG. 8B is a cross-sectional view of the fourth structure in the vicinity of the terminal area of the TFT substrate according to the first exemplary embodiment, taken along the line VIII-VIII in FIG. 8A.

In FIGS. 7A and 7B, the metal film is extending until it reaches the ends of the common line terminals 12a, i.e., the outer edge of the TFT substrate 1. However, so long as a narrow area is formed between the common line terminals 12a and the lead line 13, the metal film may be deposited only in part of the area between the common line terminals 12a, or an arbitrary notch or hole may be formed in a part of the metal film. Furthermore, as shown in FIGS. 8A and 8B, the connecting portions 14 in FIGS. 6A and 6B may be additionally provided for the structure shown in FIGS. 7A and 7B. In this case, the IPS-mode liquid crystal display device of this exemplary embodiment can even further reduce resistance along the common line routes.

Further, with reference to FIGS. 5A to 11B, for the IPS-mode liquid crystal display device of this exemplary embodiment, only a metal film (made of such a metal as Cr) for the drain lines 9 is deposited between the bus line 9a and the lead line 13. In order to further reduce resistance, a conductive film, such as an ITO film used to form a common electrode or a contact, may be partially laminated on the upper layer of the drain line layer. For example, as is shown in FIGS. 9A and 9B, an ITO film lie may be deposited on the bus line 9a and part of the lead lines 13. With this structure, resistance between the connecting of the common lines 6 and the bus line 9a and the connecting of the bus line 9a and the lead line 13 can be reduced.

Figure 9A:
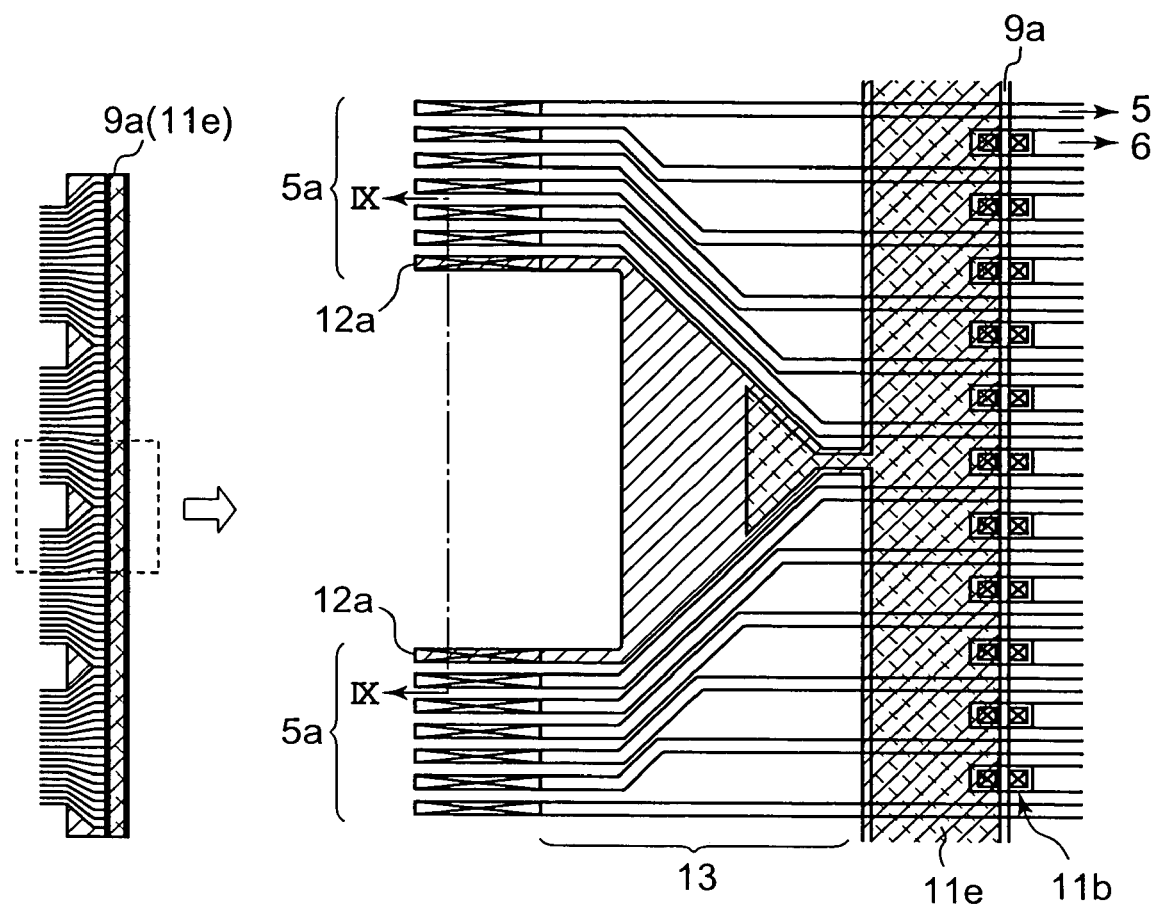
FIG. 9A is a plan view of a fifth structure in the vicinity of the terminal area of the TFT substrate according to the first exemplary embodiment.
Figure 9B:
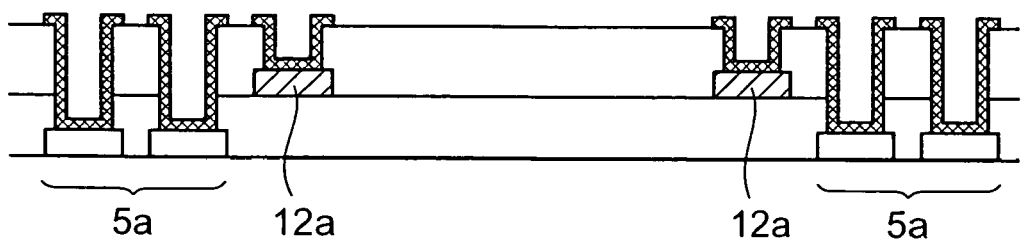
FIG. 9B is a cross-sectional view of the fifth structure in the vicinity of the terminal area of the TFT substrate according to the first exemplary embodiment, taken along the line IX-IX in FIG. 9A.

The ITO film lie is not necessarily deposited in the manner shown in FIG. 9A, and may be formed only on the connecting of the bus line 9a and the lead line 13, or may be formed across the entire surface between the bus line 9a and the lead line 13. A conductive film other than the ITO film lie may also be employed. When the structures shown in FIGS. 6A to 8B are additionally provided for the structure shown in FIGS. 9A and 9B, the IPS-mode liquid crystal display device of this exemplary embodiment can reduce resistance along the common line routes.

In this exemplary embodiment, the structure for the side whereon drain terminals 9b are arranged is not especially limited. For the conventional IPS-mode liquid crystal display device, as shown in FIG. 2, since the common line terminals 12b are formed on the same layer as the gate lines 5, these common line terminals 12b are also arranged at the ends of the blocks along the side (the upper side in this case) of the drain terminals 9b. As a result, on the side of the drain terminal 9a as well as on the side of the gate terminals 5a, an increase in resistance occurs along the common line routes.

Figure 10:
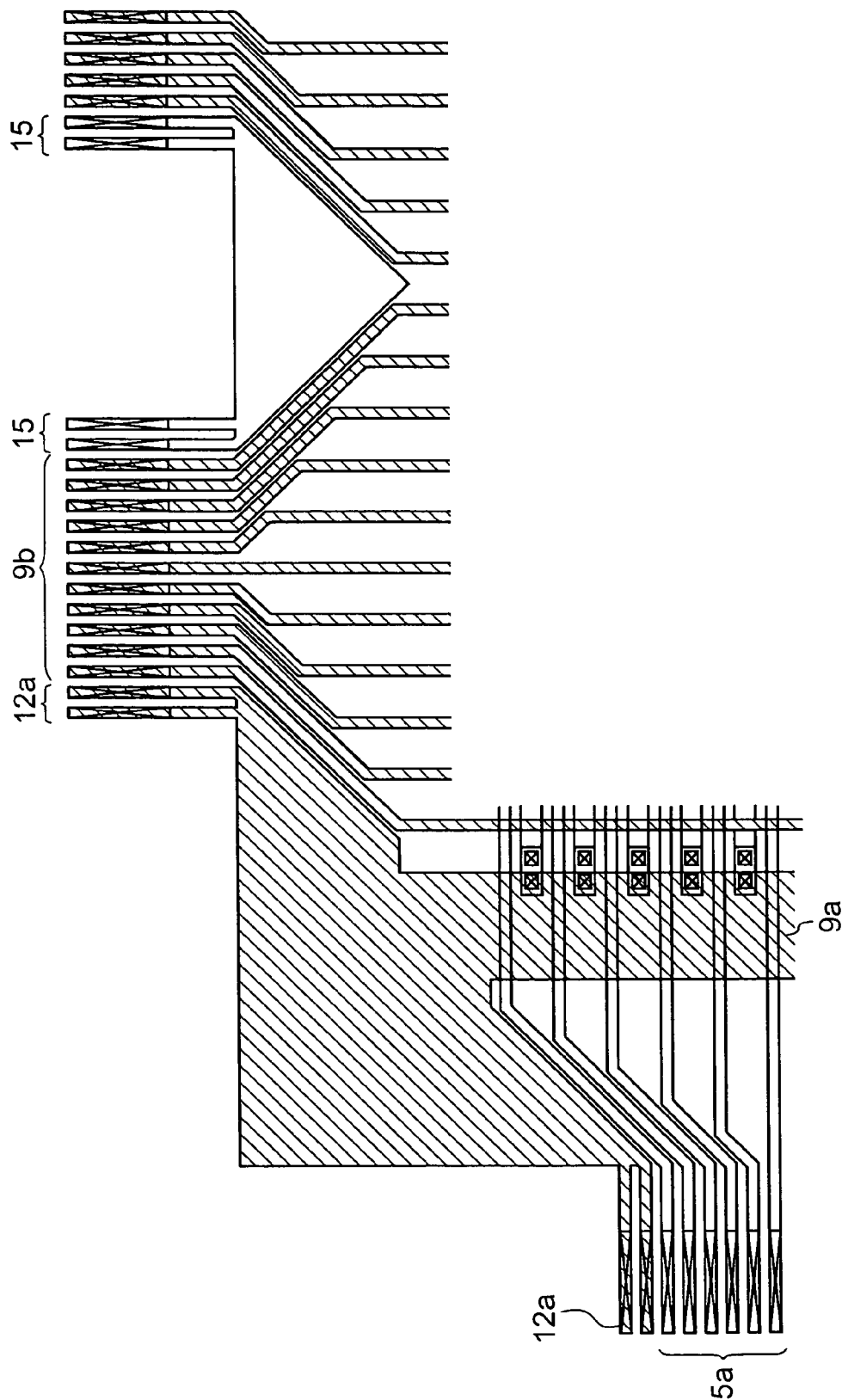
FIG. 10 is a plan view of the structure in the vicinity of a corner of the TFT substrate of the first exemplary embodiment.

Meanwhile, for the IPS-mode liquid crystal display device of this exemplary embodiment, the common line terminals 12a and the lead line 13 on the side of the gate terminals 5a are formed on the same layer as the drain lines 9. In this case, as shown in FIG. 10, the common line terminals 12a on the side of the drain terminals 9b are also formed on the same layer as the drain lines 9. Therefore, since the common line terminals 12a on the side near the drain terminals 9b can be directly connected to the bus lines 9a without contacts being used, resistance along the common line routes can be reduced.

As is described above, according to the IPS-mode liquid crystal display device of this exemplary embodiment, the common line terminals 12a and the lead line 13 therefor are formed on the same layer as the drain lines 9, and can be directly connected to the bus line 9a without contacts being used. Further, the connecting portions 14 can also be provided between the bus line 9a and the lead lines 13. Furthermore, by covering the area between the facing common line terminals 12a with the metal film, or by depositing a conductive metal, such as the ITO film lie, in an arbitrary area between the bus line 9a and the lead line 13, resistance along the common line routes can be reduced. As a result, the IPS-mode liquid crystal display device of this exemplary embodiment can prevent display failures such as traverse cross talk and flickers from occurring due to signals being delayed.

Figure 11A:
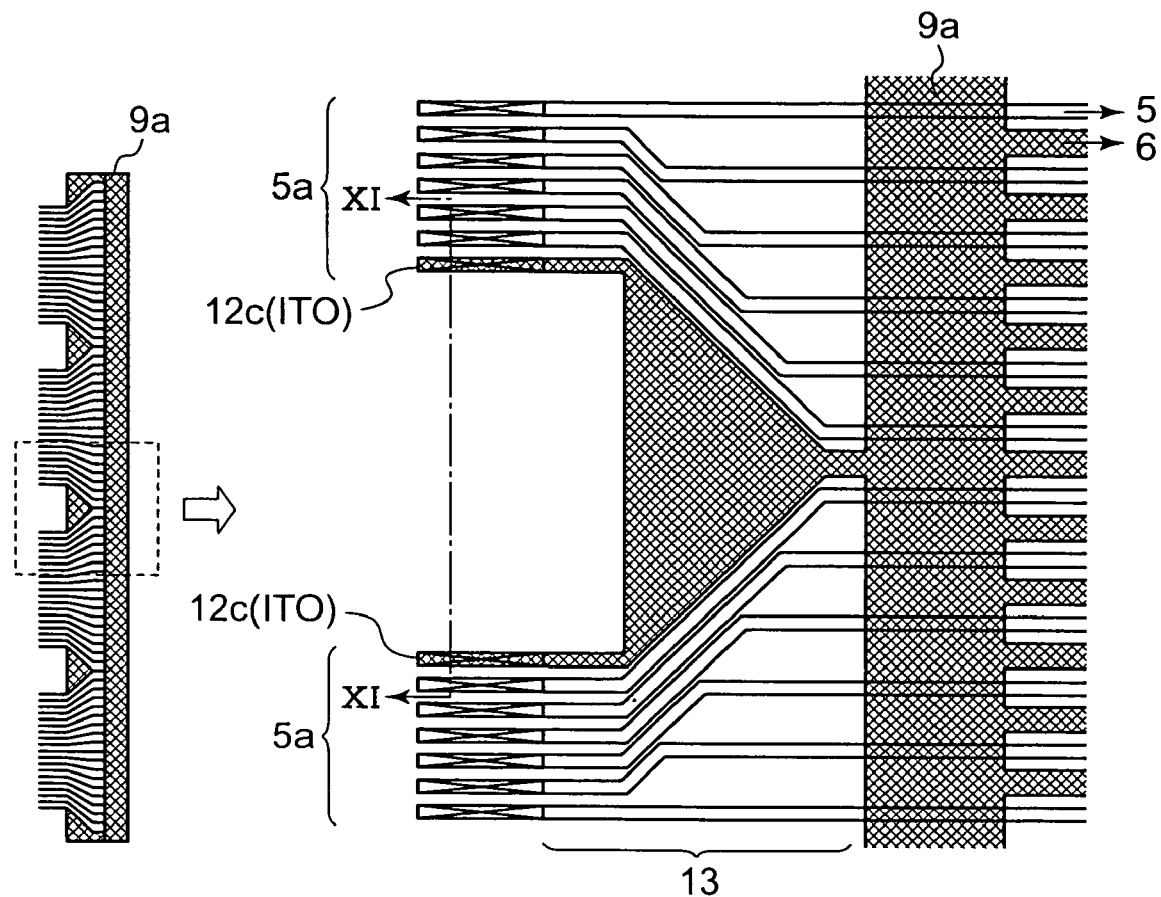
FIG. 11A is a plan view of a sixth structure in the vicinity of the terminal area of the TFT substrate according to the first exemplary embodiment.
Figure 11B:
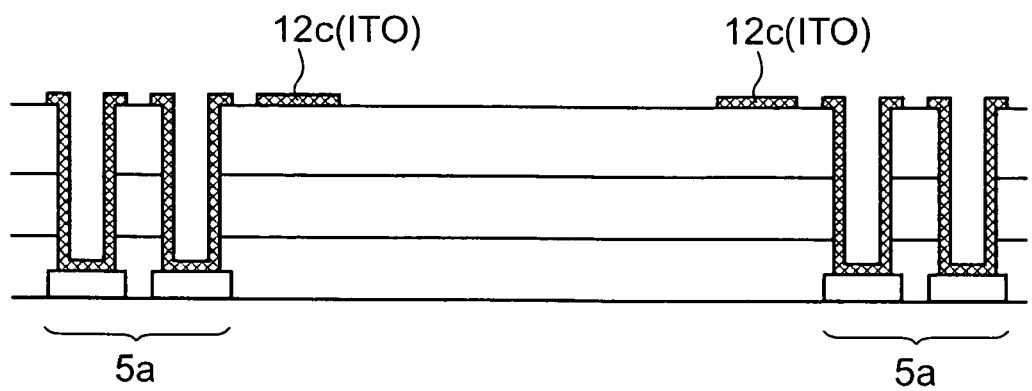
FIG. 11B is a cross-sectional view of the sixth structure in the vicinity of the terminal area of the TFT substrate according to the first exemplary embodiment, taken along the line XI-XI in FIG. 11A.

In the above description, the bus line 9a, the common line terminals 12 and the lead line 13 therefor have been formed on the same layer as the drain lines 9. However, when in addition to the bus line 9a the common lines 6 are formed on the same layer, the common line terminals 12a and the lead line 13 therefor, the common lines 6 and the common line terminals 12a can be connected directly without any contacts being used. In this case, neither the gate lines 5 nor the drain lines 9 can be employed for the IPS-mode liquid crystal display device of this exemplary embodiment. Consequently, as shown in FIGS. 11A and 11B, the IPS-mode liquid crystal display device of this exemplary embodiment can realize the above-described structure by forming an ITO film, which serves as a common electrode, collectively in extension to a common line terminal 12c, or by depositing a new dedicated line layer for common lines to form the line routes collectively from the common lines to the common line terminals.

In the above description, while the IPS-mode liquid crystal display device according to the first exemplary embodiment 5 has been explained, it will be easily understood by those skilled in the art that the above description can also be applied for an active matrix substrate.

Second Exemplary Embodiment

Figure 12A:
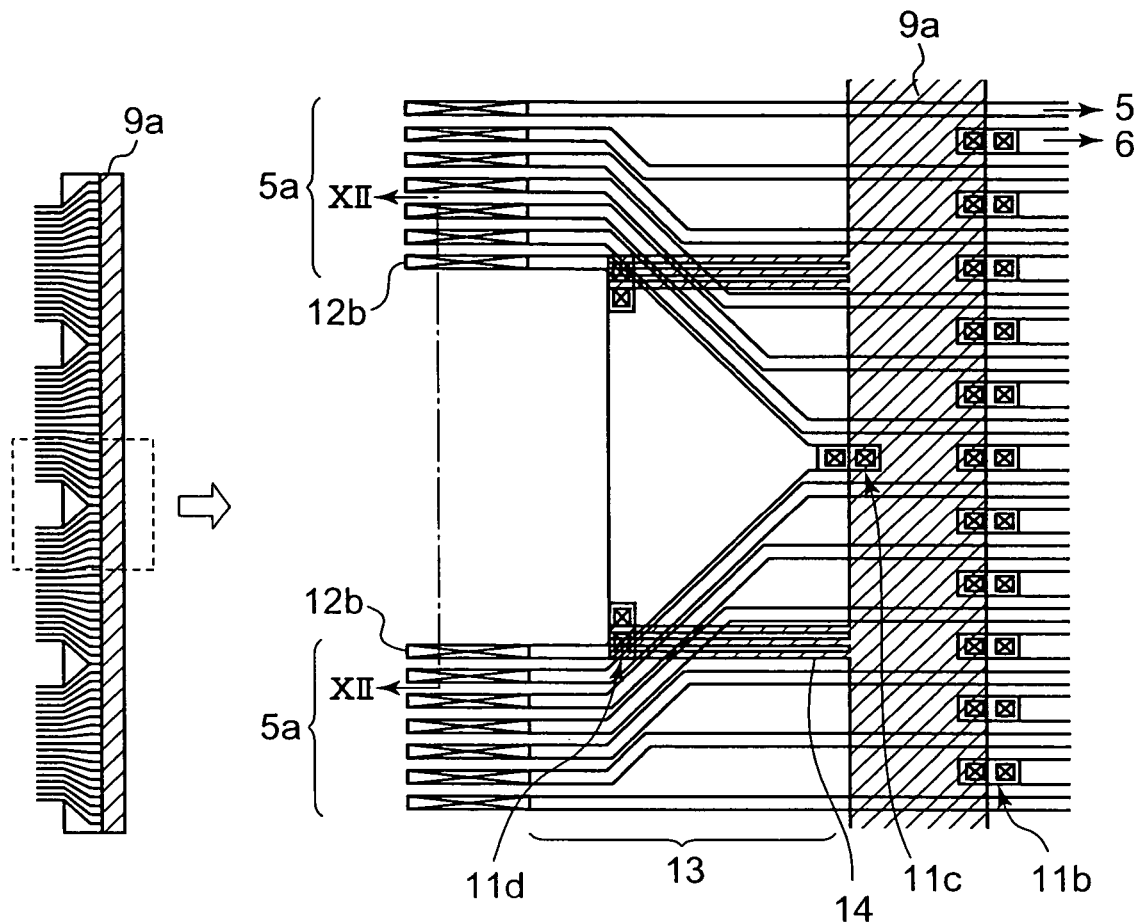
FIG. 12A is a plan view of a first structure in the vicinity of the terminal area of a TFT substrate according to a second exemplary embodiment of the present invention.

An active matrix substrate and a liquid crystal display, device according to a second exemplary embodiment of the present invention will now be described while referring to FIGS. 12A to 15B. FIG. 12A is a plan view of the structure in the vicinity of the terminal area of a TFT substrate according to the second exemplary embodiment.

Figure 12B:
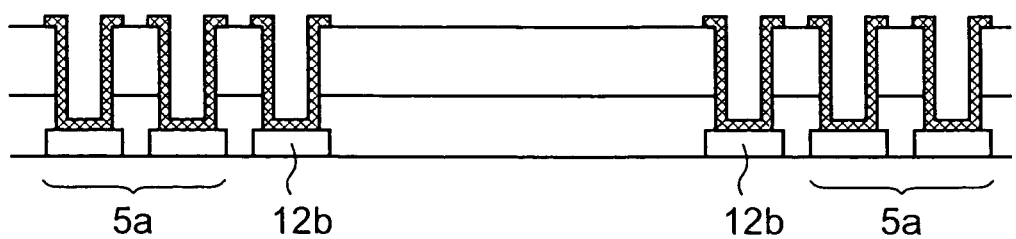
FIG. 12B is a cross-sectional view of the first structure in the vicinity of the terminal area of the TFT substrate of the second exemplary embodiment, taken along the line XII-XII in FIG. 12A.

FIG. 12B is a cross-sectional view, taken along the line XII-XII in FIG. 12A, in the vicinity of the terminal area of the TFT substrate of the second exemplary embodiment.

FIGS. 13A to 15B are diagrams showing structure variations thereof.

For the active matrix substrate and the liquid crystal display device of the first exemplary embodiment, the common line terminals 12a and the lead line 13 therefor are formed on the same layer as the drain lines 9. Meanwhile, when the structure shown in FIGS. 6A to 9B is employed for a conventional structure wherein the common line terminals 12a and the lead line 13 therefor are formed on the same layer as the gate lines 5, resistance along the common line routes can be reduced.

For example, as shown in FIG. 12A, for the active matrix substrate and the liquid crystal display device of the second exemplary embodiment, connecting portions 14 are arranged between a bus line 9a and a lead line 13 on the same layer as the bus line 9a (on the same layer as drain lines 9), and the lead line 13 and the connecting portions 14 can be connected via contacts 11d. This structure can also provide a greater reduction in resistance along the common line routes than the conventional structure.

With this structure, it is conceivable, as described in the first exemplary embodiment, that a capacitance may be generated at the intersection of the lead lines 13 for the gate terminals 5a and the lead line 13 for common line terminals 12b and the potential along the common lines 6 may fluctuate. Therefore, it is preferable that the number, the thickness, the shape and the arrangement of connecting portions 14 be designated so that the dimensions of the intersection area are as small as possible.

Figure 13A:
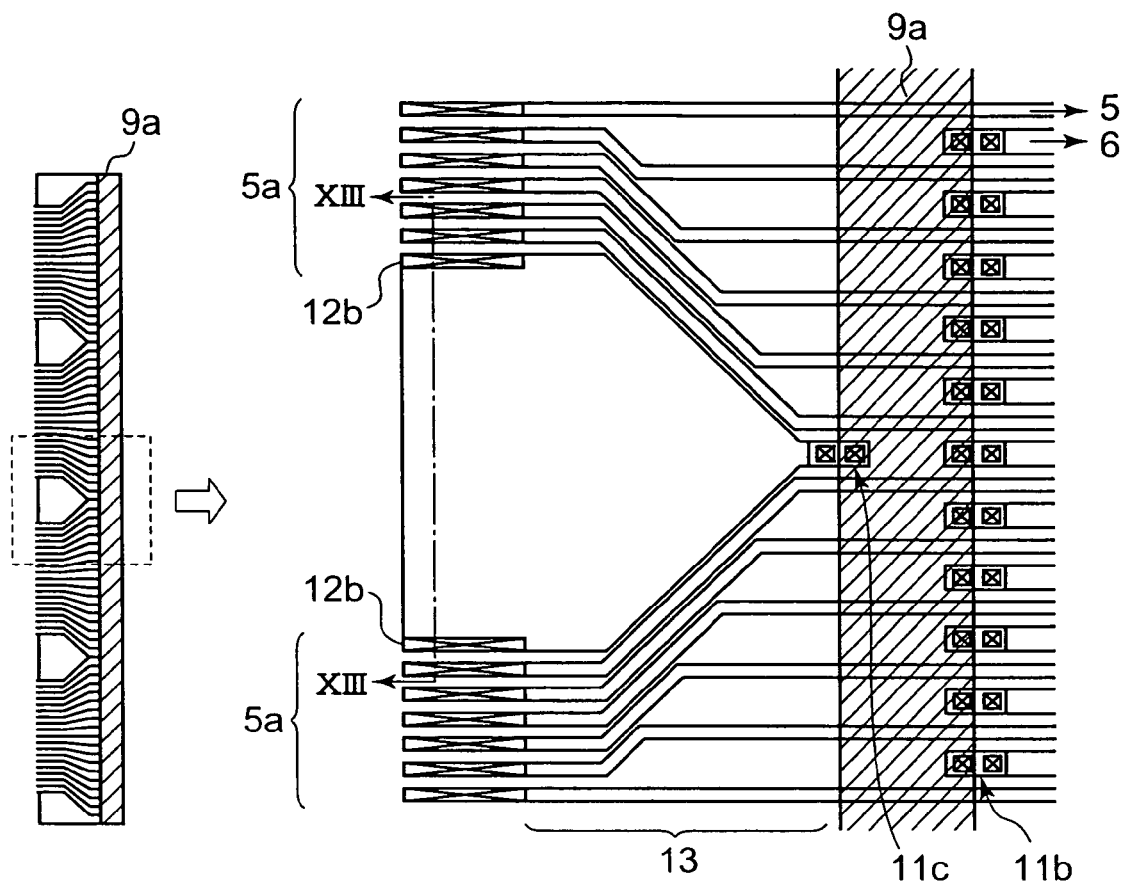
FIG. 13A is a plan view of a second structure in the vicinity of the terminal area of the TFT substrate according to the second exemplary embodiment.
Figure 13B:
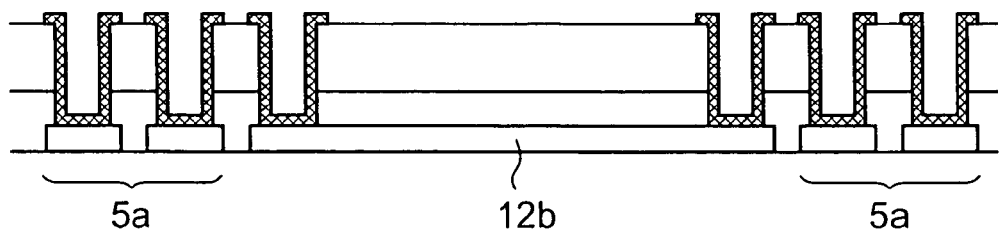
FIG. 13B is a cross-sectional view of the second structure in the vicinity of the terminal area of the TFT substrate of the second exemplary embodiment, taken along the line XIII-XIII in FIG. 13A.

Furthermore, as is shown in FIG. 13A, for a first variation of the active matrix substrate and the liquid crystal display device of the second exemplary embodiment, a metal film is deposited at least on part of an area sandwiched between the facing common terminal lines 12b, and at the same level as the common line terminals 12b (on the same layer as the gate lines 5). As a result, the dimension of the joint area of the common line terminals 12b and the lead line 13 is increased. This first variation for the second exemplary embodiment can, when compared with a conventional structure, reduce resistance along the common line routes.

Figure 14A:
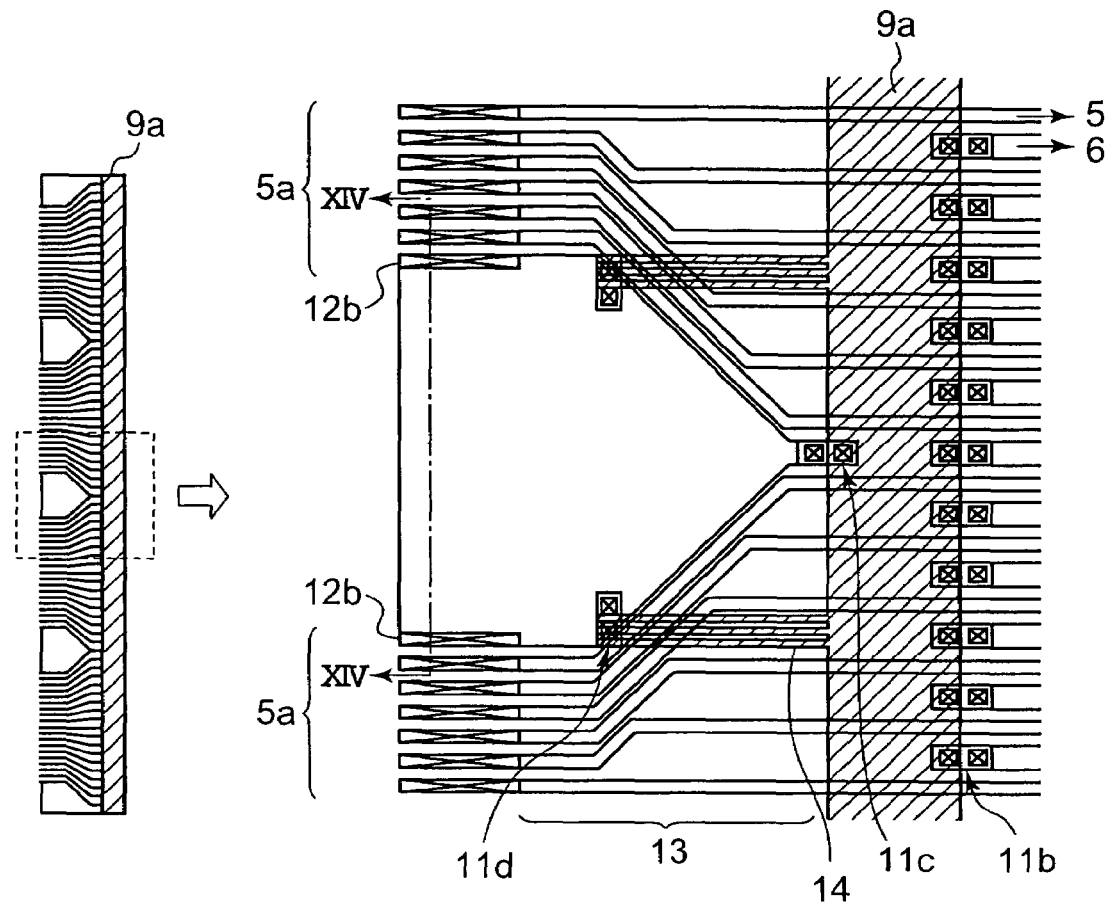
FIG. 14A is a plan view of a third structure in the vicinity of the terminal area of the TFT substrate according to a second exemplary embodiment.
Figure 14B:
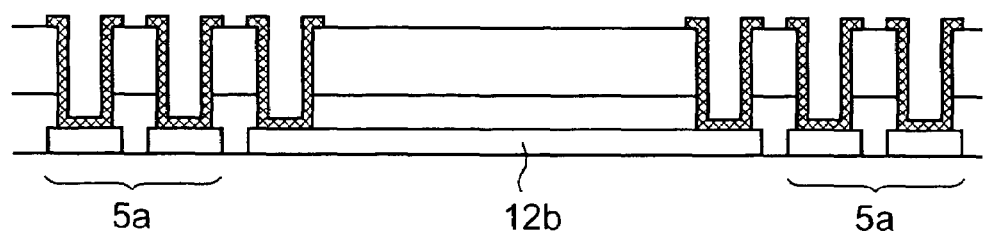
FIG. 14B is a cross-sectional view of the third structure in the vicinity of the terminal area of the TFT substrate of the second exemplary embodiment, taken along the line XIV-XIV in FIG. 14A.

For a second variation for the active matrix substrate and the liquid crystal display device according to the second exemplary embodiment, the structure in FIG. 12A and the structure in FIG. 13A are combined, as is shown in FIG. 14A. As a result, the second variation of the second exemplary embodiment can provide a greater reduction in resistance along the common line routes.

Figure 15A:
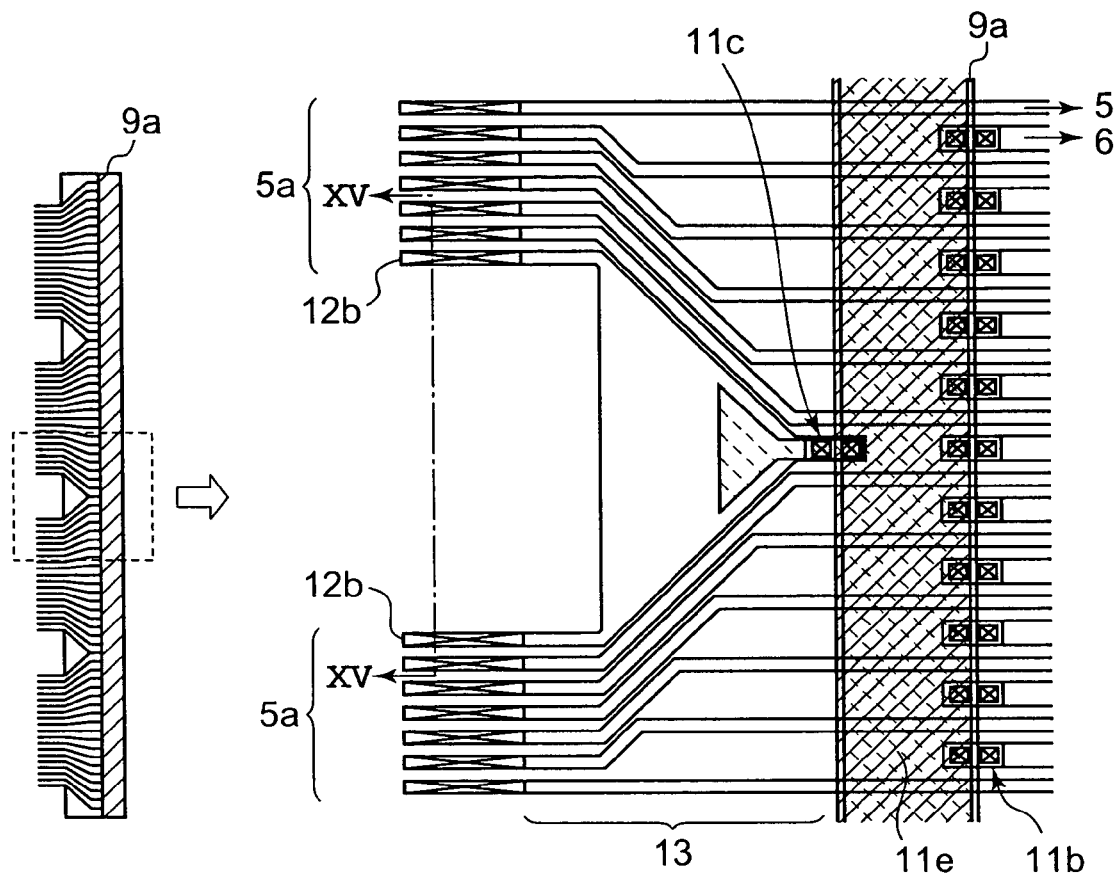
FIG. 15A is a plan view of a fourth structure in the vicinity of the terminal area of the TFT substrate according to the second exemplary embodiment.
Figure 15B:
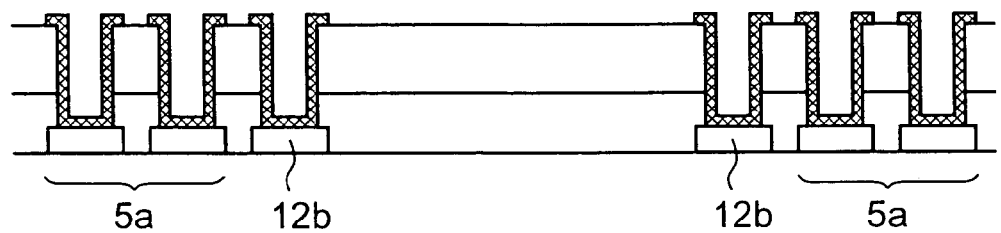
FIG. 15B is a cross-sectional view of the fourth structure in the vicinity of the terminal area of the TFT substrate of the second exemplary embodiment, taken along the line XV-XV in FIG. 15A.

For a third variation of the active matrix substrate and the liquid crystal display device according to the second exemplary embodiment, as shown in FIG. 15A, a conductive film such as the ITO film 11e is deposited at least on part of the area extending from the bus line 9a to the lead line 13, at a level higher than the drain layer, so as to provide a partially laminated structure. This third variation of this exemplary embodiment can also reduce resistance along the common line routes. Further, for a fourth variation of the active matrix substrate and the liquid crystal display device according to the second exemplary embodiment, the structures shown in FIGS. 12A to 14A are additionally provided for the third variation. With this structure, the fourth variation can further reduce resistance along the common line routes.

As is described above, according to the active matrix substrate and the liquid crystal display device of the second exemplary embodiment, and the variations thereof (structures wherein the common line terminals 12b and the lead line 13 therefor are formed on the same layer as the gate lines 5), a plurality of connecting portions 14 are employed to connect the bus line 9a and the lead lines 13.

Furthermore, according to the second exemplary embodiment, the area between the facing common line terminals 12b is covered with metal film, and a conductive material such as the ITO film 11e is deposited on an arbitrary area between the bus line 9a and the lead line 13. With these structures in the second exemplary embodiment, resistance along the common line routes can be reduced, and display failures such as traverse cross talk and flickers can be-prevented from occurring due to signal delay.

Third Exemplary Embodiment

An active matrix substrate and a liquid crystal display device according to a third exemplary embodiment of the present invention will now be described by referring to FIGS. 16A to 17B.

Figure 16A:
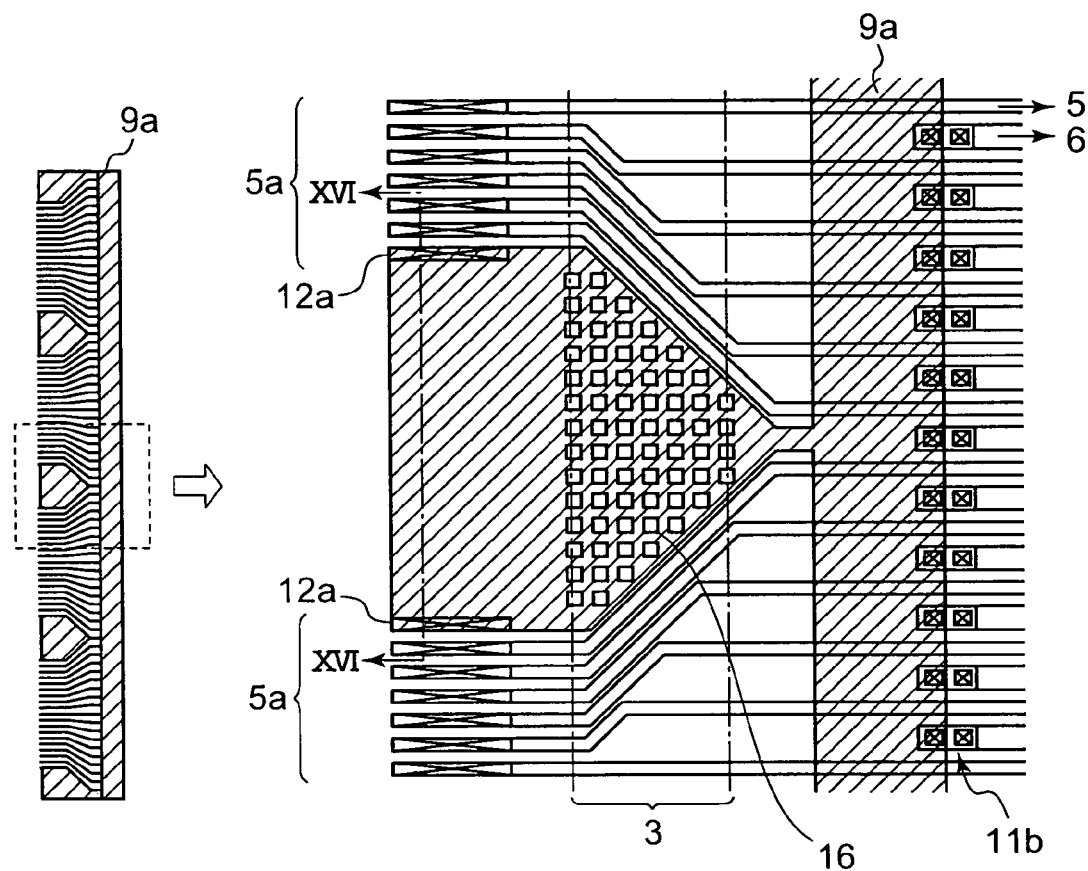
FIG. 16A is a plan view of a first structure in the vicinity of the terminal area of a TFT substrate according to a third exemplary embodiment of the present invention.
Figure 16B:
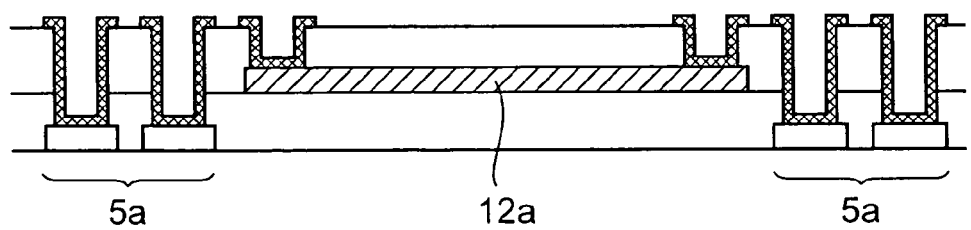
FIG. 16B is a cross-sectional view of the first structure in the vicinity of the terminal area of the TFT substrate of the third exemplary embodiment, taken along the line XVI-XVI in FIG. 16A.
Figure 17A:
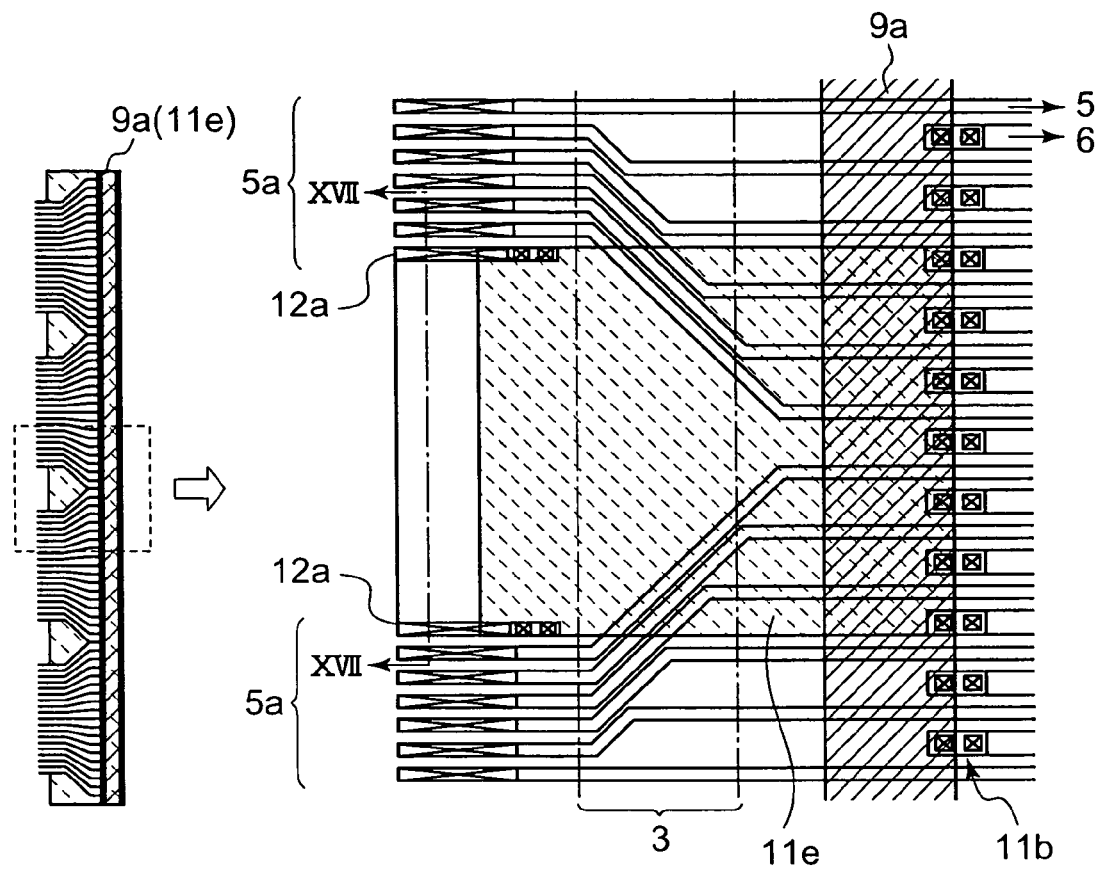
FIG. 17A is a plan view of a second structure in the vicinity of the terminal area of the TFT substrate according to the third exemplary embodiment.
Figure 17B:
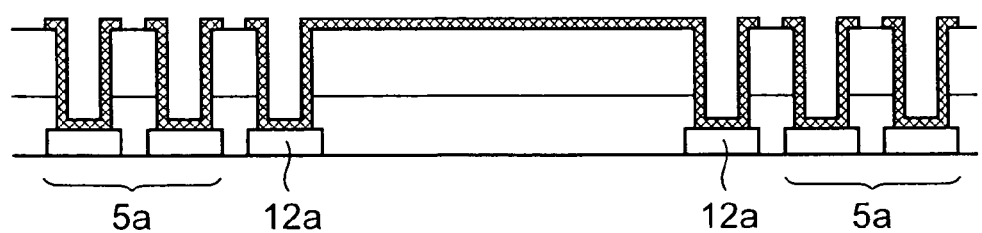
FIG. 17B is a cross-sectional view of the second structure in the vicinity of the terminal area of the TFT substrate of the third exemplary embodiment, taken along the line XVII-XVII in FIG. 17A.

FIG. 16A is a first plan view of the structure in the vicinity of the terminal area of a TFT substrate according to the third exemplary embodiment. FIG. 16B is a cross-sectional view, taken along the line XVI-XVI in FIG. 16A, of the structure in the vicinity of the terminal area for the TFT substrate of the third exemplary embodiment. FIG. 17A is a second plan view of the structure in the vicinity of the terminal area of the TFT substrate according to the third exemplary embodiment. FIG. 17B is a cross-sectional view, taken along the line XVII-XVII in FIG. 17A, of the structure in the vicinity of the terminal area of the TFT substrate in the third exemplary embodiment.

For the active matrix substrates and the liquid crystal display devices of the first and second exemplary embodiments, structures have been employed while the focus is on reducing resistance along the common line routes. To fabricate the liquid crystal display device, as described in the first exemplary embodiment, a sealing material is applied or written on the sealing area of at least one of the TFT substrate 1 and the opposed substrate, and liquid crystal is dropped or filled between the substrates. Then, the two substrates are set face-to-face and attached to each other, and the sealing material is cured by heating or ultraviolet irradiation. When an ultraviolet sealing material is employed, generally, to cure the sealing material the substrate assembly is irradiated with ultraviolet rays from the reverse surface of the TFT substrate 1. Accordingly, if the sealing material is covered with a metal film that reflects ultraviolet rays, the sealing material can not be fully exposed by the ultraviolet rays and can not be appropriately cured.

For the active matrix substrate and the liquid crystal display device according to the third exemplary embodiment, as is shown in FIGS. 5A to 9B or FIGS. 12A to 15B, a structure should be provided to prevent an adverse affect on the curing of the sealing material even when a metal film for gate lines 5 or drain lines 9 is deposited in a sealing area 3. That is, for the third exemplary embodiment, ultraviolet transmitting windows 16 are formed in a lead line 13 in the sealing area 3 to permit the passage of ultraviolet rays. Consequently, ultraviolet rays can pass through the ultraviolet transmitting windows 16 and appropriately cure the sealing material.

In FIG. 16A, the ultraviolet transmitting windows 16 are formed in the structure shown in FIG. 7A. However, these windows 16 can also be formed in other structures. The shape, the size and the arrangement of the ultraviolet transmitting windows 16 can be appropriately determined by taking into account the conditions required for curing the sealing material and resistance of the lead lines 13.

Further, for the third exemplary embodiment, in order to increase ultraviolet transmitting, the active matrix substrate and the liquid crystal display device may be provided with the lead lines 13 made of an ultraviolet transmitting conductive material such as an ITO film (used for the gate lines 5 or the drain lines 9) in the sealing area 3, instead of the lead lines 13 made of a metal film which reflects ultraviolet rays. For example, as is shown in FIG. 17A, an ITO film 11e can be deposited between a bus line 9a and common line terminals 12a to connect the bus line 9a to the common line terminals 12a. In this structure, the lead lines 13 for gate terminals 5a and the lead line 13 (the ITO film 11e in this case) for the common line terminals 12a are formed on different layers, so that a shape for the lead line can be arbitrarily defined. Furthermore, when the ITO film 11e is employed, the lead lines 13 are arranged at a distance, being separated by at least a gate insulating film 7 and an inter-layer insulating film 10. Therefore, capacitance produced between the gate line routes and the common line routes can be reduced, and fluctuation of the potential along the common line routes can be suppressed.

As is described above, for the active matrix substrate and the liquid crystal display device in the third exemplary embodiment, when a metal film is employed for the lead lines 13, the ultraviolet transmitting windows 16 are formed in the metal film in the sealing area 3, or the lead lines 13 in the sealing area 3 are formed by using an ultraviolet transmitting conducive material such as the ITO film 11e. With this arrangement, not only can resistance along the common line routes be reduced, but also the sealing material can be appropriately irradiated by ultraviolet rays and easily cured.

The following exemplary advantages can be provided by the liquid crystal display device according to the present invention. That is, as is described above, the present invention can employ the various structures described above to reduce resistance along the common line routes, so that display failures due to the delay of signals transmitted along the common line routes can be avoided. Furthermore, by forming the lead lines on the sealing material in a condition that the lead lines do not disturb ultraviolet radiation, the sealing material can be appropriately cured.

A first exemplary advantage offered by the invention is that resistance along the common line routes can be reduced, and display failures such as traverse cross talk and flickers due to the delay of signals transmitted along the common line routes can be prevented.

The first exemplary advantage is realized for the following reason. On an active matrix substrate, where blocks are formed by aggregating a predetermined number of gate terminals, and where common line terminals are provided at both ends of each of the above-described block, the common line terminals and the lead lines therefor are formed on the same layer as drain lines. Then, bus lines outside a display area, which are formed on the same layer as the drain lines, are connected to the lead lines on the same layer, without any contacts being used. Further, the lead lines for the common line terminals and the bus lines are connected by a plurality of connecting portions. Thus, the substantially entire surface of each of the areas, which is enclosed by the facing common line terminals and the lead lines therefor, is covered by a metal line, and a conductive material on another layer is laminated at least on the connecting portions of the lead lines and the bus lines. Furthermore, the common lines, the bus lines, the lead lines and the common line terminals in the display area are sequentially formed on the same layer by using lines located on a layer differing from the layer on which the gate lines or the drain lines are formed. With the thus obtained arrangement, resistance along the common line routes can be reduced.

Another exemplary advantage offered by the invention is a reduction in ultraviolet reflection of the lead line for appropriately curing sealing material.

Such exemplary advantage is realized by a provision where specific ultraviolet transmitting windows are formed at least in the lead lines in the sealing area wherein a sealing material is applied or written, or by a provision where the lead lines are formed using an ultraviolet conductive material such as an ITO.

It is apparent the present invention is not limited to the above exemplary embodiments, but may be modified and altered without departing from the scope and spirit of the invention.

In other words, while the active matrix substrate used for the liquid crystal display device has been heretofore described while referring to the respective exemplary embodiments, the present invention is not limited to these exemplary embodiments and can also be applied for an active matrix substrate used for other display devices including an organic EL display device.

Further, the inventor's intent is to retain all equivalents of the claimed invention even if the claims are amended during prosecution.

What is claimed is:

1. An active matrix substrate comprising:
   a plurality of scan lines and a plurality of common lines, extending in a first direction on the active matrix substrate;
   a plurality of signal lines extending in a second direction on the active matrix substrate;
   pixels disposed in areas defined by the scan lines and the signal lines;
   bus lines;
   a terminal area disposed outside the bus lines;
   a plurality of scan line terminal groups located outside the terminal area;
   common line terminals provided on either end of each of the scan line terminal groups to be connected to the common lines through the bus lines; and
   common line lead lines for connecting the facing common line terminals of the adjacent scan line terminal groups and the bus lines,
   wherein the common line terminals, the common line lead lines, and the bus lines are disposed on an entire first layer of the active matrix substrate, while the plurality of the scan line terminal groups, the plurality of the scan lines, and the plurality of the common lines are disposed on an entire second layer of the active matrix substrate, wherein the first layer is different form the second layer.

2. An active matrix substrate according to claim 1, wherein the common line terminals and the bus lines comprise a material for lines on the same layer.

3. An active matrix substrate according to claim 1, wherein the signal lines are disposed on the first layer.

4. An active matrix substrate according to claim 1, wherein the bus lines and the common line lead lines are connected by a plurality of connecting portions.

5. An active matrix substrate according to claim 4, wherein the plurality of connecting portions include connecting portions which do not intersect scan line lead lines connected to scan line terminals, and connecting portions which intersect at least one of the scan line lead lines, viewed in the normal direction of the active matrix substrate.

6. An active matrix substrate according to claim 1, wherein the substantially entire surface of an area, which is enclosed by the facing common line terminals of the adjacent scan line terminal groups and by the common line lead lines, is covered with a metal film.

7. An active matrix substrate according to claim 1, wherein the active matrix substrate further comprises:
   a display area where the pixels are arranged in a matrix on the active matrix substrate, wherein the bus lines are located outside the display area and the pixels are arranged in a matrix extending in a direction substantially parallel to the signal lines.

* * * * *

UNITED STATES PATENT AND TRADEMARK OFFICE
CERTIFICATE OF CORRECTION

| | | |
|---|---|---|
| PATENT NO. | : 7,609,354 B2 | Page 1 of 1 |
| APPLICATION NO. | : 11/090662 | |
| DATED | : October 27, 2009 | |
| INVENTOR(S) | : Takayuki Konno et al. | |

It is certified that error appears in the above-identified patent and that said Letters Patent is hereby corrected as shown below:

Column 7, line 65, delete "terminals Sa" and insert --terminals 5a--.

Column 9, line 12, delete "ITO film lie" and insert --ITO film 11e--.

Column 9, line 17, delete "ITO film lie" and insert --ITO film 11e--.

Column 9, line 21, delete "ITO film lie" and insert --ITO film 11e--.

Column 9, line 56, delete "ITO film lie" and insert --ITO film 11e--.

Column 10, line 13, delete "to the first exemplary embodiment 5" and insert --to the first exemplary embodiment--.

Column 10, lines 20-21, delete "liquid crystal display, device" and insert --liquid crystal display device--.

Column 11, line 38, delete "can be - prevented" and insert --can be prevented--.

Signed and Sealed this

Twenty-eighth Day of September, 2010

David J. Kappos
*Director of the United States Patent and Trademark Office*